United States Patent [19]
Marchak et al.

[11] Patent Number: 6,006,195
[45] Date of Patent: Dec. 21, 1999

[54] PRODUCT DEVELOPMENT SYSTEM AND METHOD USING INTEGRATED PROCESS AND DATA MANAGEMENT

[75] Inventors: Lori C. Marchak, Marblehead; Martin Dickau, Carlisle; Jeffrey G. MacAllister, Chestnut Hill, all of Mass.; Patrice A. Tegan, Hollis, N.H.

[73] Assignee: Workgroup Technology Corporation, Lexington, Mass.

[21] Appl. No.: 08/638,106

[22] Filed: Apr. 26, 1996

[51] Int. Cl.⁶ .................................................. G06F 17/60
[52] U.S. Cl. ............................. 705/9; 705/1; 364/468.01
[58] Field of Search ......................... 705/7, 8, 9, 1; 364/468.01, 468.05, 468.06, 468.07, 468.08, 468.09, 468.1, 468.15; 707/103

[56] References Cited

U.S. PATENT DOCUMENTS

| | | | |
|---|---|---|---|
| 4,875,162 | 10/1989 | Ferriter et al. | 364/401 |
| 5,016,170 | 5/1991 | Pollalis et al. | 364/401 |
| 5,216,592 | 6/1993 | Mann et al. | 364/401 |
| 5,216,612 | 6/1993 | Cornett et al. | 364/468 |
| 5,311,438 | 5/1994 | Sellers et al. | 364/468 |
| 5,321,605 | 6/1994 | Chapman et al. | 364/402 |
| 5,355,317 | 10/1994 | Talbott et al. | 384/468 |
| 5,500,800 | 3/1996 | Talbott | 364/468 |
| 5,671,360 | 9/1997 | Hambrick et al. | 395/209 |
| 5,758,347 | 5/1998 | Lo et al. | 707/103 |

OTHER PUBLICATIONS

Guide by Adra Systems, "A Guide to The Matrix System", Version 3.0, 1995, 19 pages.

Summary by Adra Systems, "The Matrix System Technical Summary", Version 3.0, 1995, 28 pages.

*Primary Examiner*—Eric W. Stamber
*Assistant Examiner*—Hani M. Kazimi
*Attorney, Agent, or Firm*—Testa, Hurwitz & Thibeault, LLP

[57] ABSTRACT

A system, and related method, for managing the development of a project includes a memory device and at least one category definition stored in the memory device. Each category definition is representative of a discrete work deliverable required to complete the project being managed and has at least one stage. Each stage defines a portion of the definition's life-cycle and is completed only upon the submission of substantive information required by the stage to create the discrete work deliverable.

21 Claims, 18 Drawing Sheets

FIG. 8

PRODUCT DEVELOPMENT SYSTEM AND METHOD USING INTEGRATED PROCESS AND DATA MANAGEMENT

FIELD OF THE INVENTION

The invention relates to a computer-based system and method for managing product development and, in particular, to a definition-oriented computer software system that successfully automates product development by integrating the definition and electronic storage of all types of employee work deliverables with the definition and execution of business policy for creating, assigning, scheduling, completing and distributing those deliverables.

BACKGROUND OF THE INVENTION

Interest in automating business processes using computer software is growing rapidly. Computer software known as "workflow" software allows business processes to be defined as a series of sequential and parallel tasks, where each task describes the work to be done and defines the people or roles assigned to the task. Workflow software automates business processes by routing tasks to assigned users. When a task is started, the user assigned to complete that task is notified. When that user indicates the task is done, the next task is started, and so on.

Similarly, interest in automating the management of electronic documents and data produced by individual employees is also increasing. Computer software known as Product Data Management (PDM) software allows businesses to define specific types of employee work deliverables, such as requirements, specifications, engineering designs, and change requests. Businesses may store and retrieve electronically the data and files that make up each deliverable. Users can store, retrieve, or check out (modify) work deliverables. Related data are stored in an underlying database. Electronic files are stored in an underlying file storage system. Changes to deliverables are preserved and can be tracked across time. Relationships between deliverables are stored and tracked. Read, write, and delete access to stored information is controlled. Some PDM products also control: read, write, and delete access to each deliverable; the current state of each deliverable; display of custom data entry form for each type of work deliverable; and configurations of deliverables such as assemblies and their subcomponents.

A combination of workflow software and PDM software, henceforth called Work Management (WM) software, would allow businesses to automate business processes and simultaneously manage the employee-produced deliverables associated with those processes.

Despite promising benefits, known WM software products generally have key limitations that prevent their successful adoption on a broad scale. These limitations include: insufficient ease of use, so that for most individual end users the additional work required to use the system is greater than the perceived benefits; insufficient tailorability, so that defining and modifying process and deliverable definitions to reflect evolving business practices is difficult and requires special skills; and insufficient flexibility to handle normal, employee-driven, process variations in connection with structured, company-driven processes.

Known WM software is difficult to use because task definitions usually do not specify the specific fields and attachments that the user needs to see, can fill in, and must fill in to complete the task. Rather, when a deliverable is displayed, all fields and attachments are generally visible and editable, regardless of where the deliverable is in the overall process in much the same way that a person, presented with a printed form, is given no direction as to which information is required to be entered. For this reason, users must be trained to properly execute deliverables based on the implemented process. Users may be overwhelmed by unnecessary information and are not prevented from filling in or changing the wrong fields or attachments.

Known WM software is difficult to tailor, and therefore lacks flexibility, in dynamic business environments because it generally supports only structured, pre-defined work processes. Put another way, in cases where WM Software supports ad-hoc tailoring, the user is required to create a new process definition that is only a variation of the initial process definition. End users cannot add, modify or delete tasks in an ongoing process to account for normal process variations and staffing considerations. Because most business processes are dynamic and often have a significant ad hoc component, the set of supported applications is severely limited.

These limitations arise because, in known WM software, process steps are separated from the deliverable that those steps create. Thus, users must take duplicate steps to create a deliverable and then indicate that it is done. Similarly, in order to change the requirements for a deliverable, the process underlying the deliverable must be changed, as well as the deliverable itself. Thus, the user must remember to make two changes instead of simply one. Further, some WM software requires different users to change the deliverable and the process underlying the deliverable. Thus, for known WM software, addition of significant ad hoc components generally results in numerous errors, including process steps which no longer match the requirements of delivering the products they underlie.

SUMMARY OF THE INVENTION

The work management system of the present invention includes a memory device, at least one category definition, and at least one category instance. Each category definition is stored in the memory device and has associated with it at least one stage definition which is also stored in the memory device. The category instance, which is itself stored in the memory device, represents a discrete work deliverable which is required to complete the project that is being managed. The category instance is defined by the category definition and has a life-cycle which is described by stages, which are defined by the stage definitions associated with the category definition. Each stage is complete only upon the entry of substantive information that is required to create the discrete work deliverable.

In some embodiments, an attribute describes a field that each category instance possesses. In some embodiments the field provides for the direct entry of substantive information while in other embodiments the field identifies a file containing substantive information. In yet other embodiments, the field relates the category instance to other category instances.

In other embodiments the system includes a display and an input device associated with a system user and the display and input devices allow the system user to create, modify, and delete category definitions and instances. In certain of these embodiments the system includes a graphical user interface which is displayed on the display and manipulated via the input device.

In still other embodiments the stage definitions associated with the category definitions control access to category instances for each stage of the category definition. In certain of these embodiments, access to category instances is controlled as the instance moves from one stage to another by controlling the presentation of fields of the category instances. Fields may be presented to a user based on whether those fields are viewable, editable or required during the stage represented by the category instance.

In yet other embodiments, the system users are represented by a category instance. In certain of these embodiments each user category instance includes a field which relates the user category instance to a second category instance that represents a group of users.

In another aspect of the invention, the work management system of the present invention includes a memory device and a category instance which is stored in the memory device. In this aspect, the category instance has at least one stage and represents a discrete work deliverable which is required to complete the project being managed. The category instance has a life-cycle defined by its stage or stages. Each stage is complete only upon the entry of substantive information required to create the discrete work deliverable represented by the category instance.

In yet another aspect, the work management system of the present invention includes a means for notifying an appropriate user when work must be done to complete a stage of a category instance, means for controlling the access of that user to the fields included in the category instance that is responsive to the stage that the category instance represents, and a means for allowing a user to indicate that substantive work on the category instance has been completed.

In still another aspect of the invention the work management system is provided as an article of manufacture which has computer-readable program means embodied thereon. Computer-readable program means for notifying a user when substantive work is necessary to complete a stage of a category instance is embodied on the article of manufacture, as is computer-readable program means for controlling the access of that user to certain fields of the category instance to be worked upon. Also included on the article is computer-readable program means for allowing said appropriate user to indicate that work on the category instance has been completed.

The system described above provides a work management system that allows users to define and modify processes in a simple manner because process is defined solely in terms of life-cycle stages of individual work deliverables. Thus, an overall process definition is an emergent property of the processes of individual, related components and a product structure that includes all types of related deliverables is the project work breakdown structure. Individual work deliverables are defined in terms of a sequence of life-cycle stages, where each stage defines the roles responsible for planning, doing, administering, and receiving the deliverable at that stage, and the specific fields and attachments that are visible, modifiable, and required at that stage.

Put another way, no extra steps are required to indicate when a product is ready to transition from one stage of its life-cycle to the next. Deliverables always exist in a life-cycle stage, and are assigned to one or more users. When a user checks out a deliverable to work on it, a stage of the deliverable has started. When a user checks the deliverable back into the system, the stage of the deliverable is completed, as long as no other users are required to provide additional information. Thus, by simply doing the work, the user participates in the process.

Process modification is simple because overall business policy is defined in terms of individual deliverable stages, and the attribute fields and attachments that are visible, editable and required at each stage. Work deliverables, stages, attributes and attachments are defined using a graphical user interface, where authority to define policy is granted separately for each type of deliverable. In this way, individual departments or specific users can modify business policy definitions for those aspects of the business for which they are responsible or have particular knowledge.

Ad hoc modification of processes is achieved simply by adding, replacing, or removing attachments to items using a graphical user interface. Thus, process modification is achieved by recombining the constituent deliverables and their inherent processes, not by altering a process definition. The flexibility of this ad hoc process changes can be controlled at each stage in an item's life-cycle, by specifying who can edit the item's attachments, which attachments are visible, which are editable, and which are required.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 8 is a diagrammatic view of an embodiment of the graphical user interface of the present invention showing a Category Window.

DESCRIPTION

In the context of this disclosure and the claims appended hereto, references to a product database can generally apply to any type of business and a variety of types of data, data formats, and storage media. For example, the product database may include a list of all the parts required by a manufacturing business to create a finished product for sale. Alternatively, the product database could include chapters of a technical manual that are required to be written and edited by one or more technical writers. The product databases referred to in this disclosure may be stored in a variety of different types of memory elements, such as random access memory, hard disks, floppy disks, redundant arrays of independent disks, multiple disks distributed over a network, magnetic tapes, or optical disks.

Figure 1:
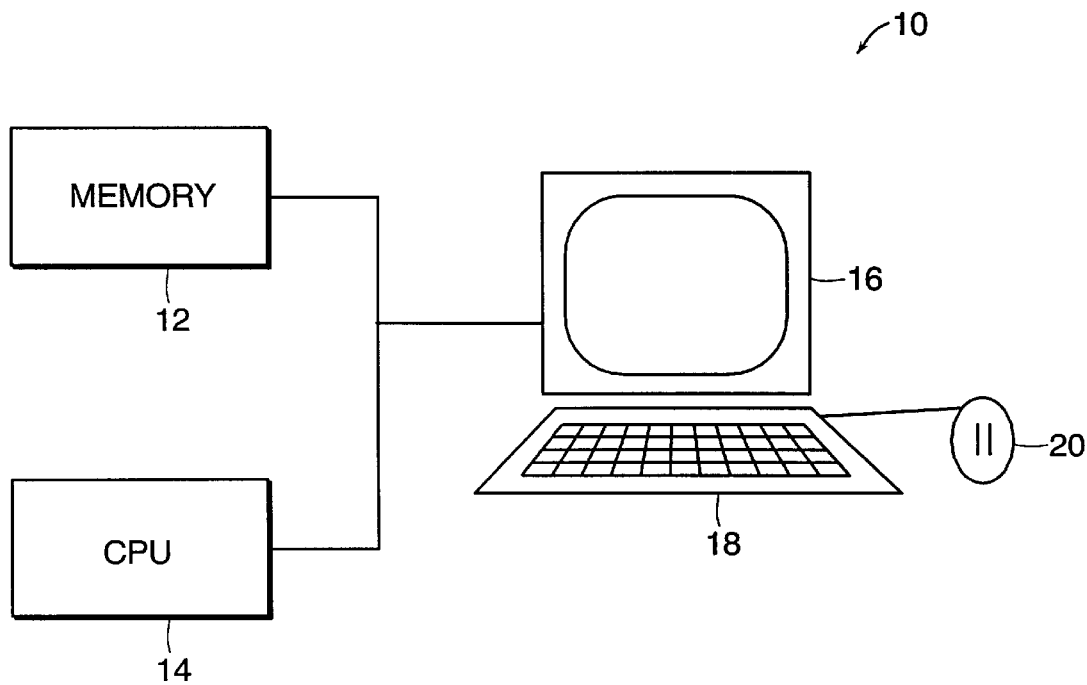
FIG. 1 is a block diagram of a system according to the invention.

Referring now to FIG. 1, a system 10 according to the invention includes memory 12, a central processing unit 14, an optional display 16, and one or more optional input devices such as a keyboard 18 and a mouse 20. Also, one or more output devices (e.g., printer, etc.) typically are provided. The system can be provided as specialized hardware configured solely to provide functionality for the system 10, although it is currently preferred to provide the system 10 as software capable of running on any general-purpose computer, for example, an Apple Macintosh, an IBM Personal Computer, an IBM PC-clone, or a workstation.

When provided as software running on a general-purpose computer, the system 10 can run "on top of" any one of a variety of operating systems and database programs. The term "on top of" is used to indicate that the program that runs "on top of" another, in this case the system 10, makes requests of the program that is "below" it. Thus, if the system 10 runs "on top of" a database program, the system 10 makes requests and issues commands to the database program that is "below" it.

Figure 2:
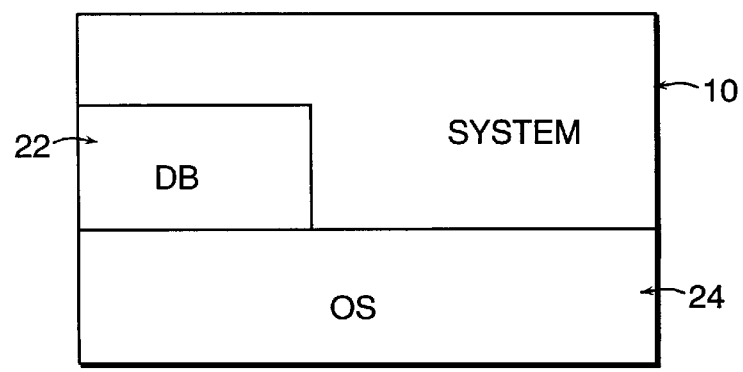
FIG. 2 is a block diagram showing the software architecture of an embodiment of the invention.

Referring now to FIG. 2, a software architecture diagram shows one embodiment of the system 10 running "on top of" both a database program 22 and an operating system 24. In the embodiment of FIG. 2, the database program 22 itself runs "on top of" the operating system 24. For example, the system 10 may run on top of a database and an operating system. Databases can include any known database programs, such as SYBASE or ORACLE. Operating systems can be, for example, DOS, WINDOWS, MAC/OS, or UNIX. Thus, for the embodiment shown in FIG. 2, the system 10 can make requests of the database 22, i.e. "run a search for objects that are in their planning stage," which the database 22 executes, subsequently presenting the results of the request to the system 10. Additionally, the system 10 can make a request of the operating system 24, i.e. "show me the files in this directory." The operating system 24 would respond directly to the system 10 in this case.

Figure 3:
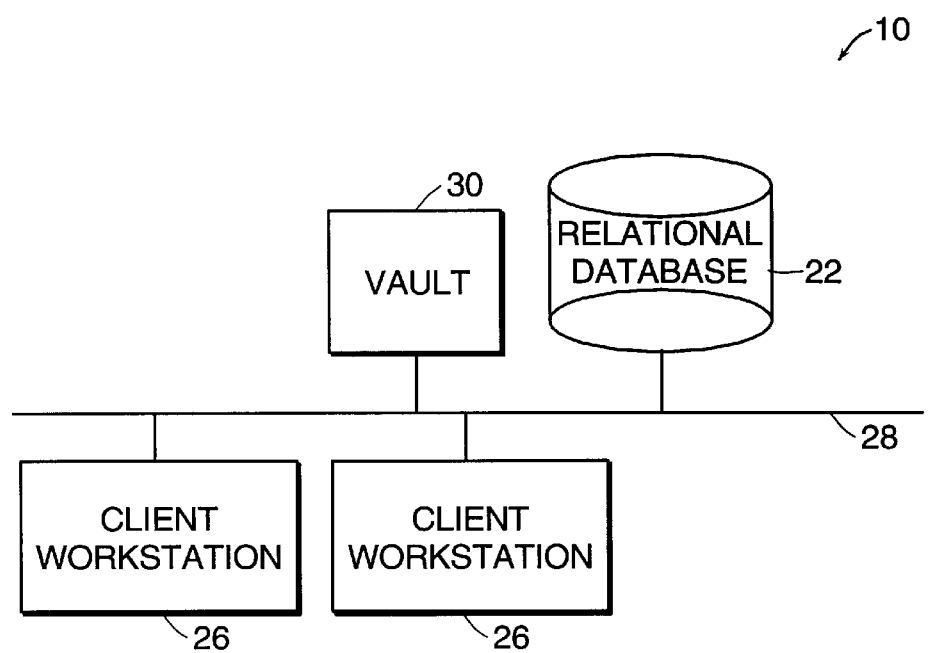
FIG. 3 is a block diagram of a system of the invention with networked memory devices.

Referring now to FIG. 3, an embodiment of the system 10 which includes multiple client workstations 26 is shown. Each client workstation 26 is a system 10 as shown in FIG. 1 having at least a central processing unit 14 and a memory device 12. Each client workstation 26 is connected to a network 28. The database 22 provides a library of objects for the system 10 which can be searched, and a vault 30 provides archival storage for copies of files and objects. The network 28 can be, for example, a wide area network or a local area network, and can utilize any one of a number of different protocols. The currently preferred network protocol is TCP/IP. The networked embodiment of the invention shown in FIG. 3 provides networked memory devices 12 which allow separate users to use the system 10 from their own workstations 26 while working on a common project stored in the database 22 and the vault 30.

Regardless of whether the system 10 is embodied as a number of networked client workstations 26 or a stand-alone machine, each object to be tracked, stored, represented, and manipulated by the system 10, is stored in the database 22 or vault 30 and is represented by an instantiation of a category definition. These instantiations, hereinafter referred to as category instances, may represent work deliverables, sub-parts of work deliverables, users of the system 10, groups of users of the system 10, or relationships between work deliverables; category instances are defined by a number of definitional items. These definitional items are: the category definition of which they are an instantiation; attributes associated with the category definition; link definitions associated with the category definition; and stage definitions which are associated with the category definition. Each of these definitional items is discussed, in turn, below.

A category definition defines the structure and relationships that its instantiations will have when invoked, and is generally any data structure capable of supporting: definition by users; association of attributes, link attributes, and stage definitions; hierarchical arrangement; and instantiations of itself. It is currently preferred that category definitions of the present invention are data structures having at least the properties shown below in Table 1.

TABLE 1

Category Definition Properties

| Name | Description |
| --- | --- |
| Name | Text string used to identify and label the category definition. |
| Description | Textual paragraph used to describe the category definition's intended meaning or use. |
| Abstract | Boolean flag that, if true, prevents instances of the category definition from being created. |
| Number from | Integer used as the starting number in an automatic sequence generator that adds one for every instance created of the category definition. The current value of the sequence generator can be used to generate a default attribute value. |
| Instance type | One of the following predefined category definitions: company; document; facility; file; form; group; kit; part; user; tool; and unspecified. |
| Doer | People with the authority to modify the category |

TABLE 1-continued

Category Definition Properties

| Name | Description |
|---|---|
| | definition, including its content-related attributes, form templates, link types, link type attributes, and subcategories. |
| Planner | People with the authority to modify the category definition's stage definitions. |
| Distribution | People who have authority to list the category definition, browse or obtain information about the contents. |
| Administrator | People who have authority to add items to instances of the category definition that are beyond the first stage in their life-cycle. |

Each category definition has a number of associated attributes, link attributes, and stage definitions, which can be associated with the category definition either by the user or by the system, and which are discussed in more detail below. Additionally, it is preferred to associate a "parent category" identifier with each category definition. The parent category identifier provides for the inheritance of characteristics such as the associated attributes, link attributes, and stages.

Figure 4:
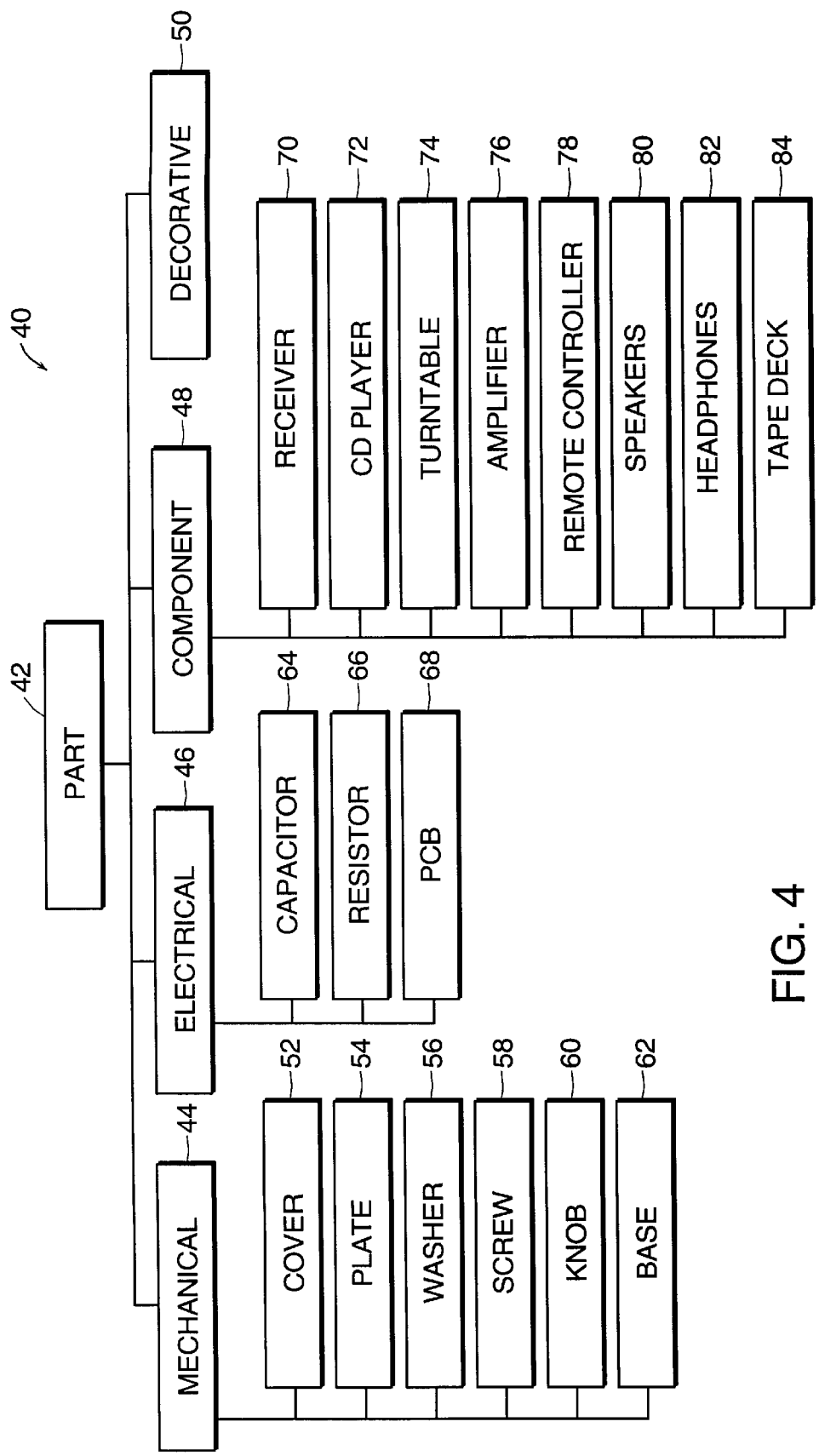
FIG. 4 is a block diagram of a category definition hierarchy.

For example, referring briefly to FIG. 4, a manufacturer that desires to manage the development and production of stereo components could set up a category definition hierarchy 40 which includes a Part category definition 42. The Part category definition 42 is intended to represent manufactured products, assemblies, and low-level parts which make up manufactured products. The Mechanical category definition 44, the Electrical category definition 46, the Component category definition 48, and the Decorative category definition 50 all have a parent category identifier which, in this embodiment, point to the Part category definition 42.

Thus, the Mechanical category definition 44, the Electrical category definition 46, the Component category definition 48, and the Decorative category definition 50 inherit at least some, and preferably all, of the attributes, link attributes, and stage definitions associated with the Part category definition 42. The parent category identifier also indicates that an instance of the Mechanical category definition 44, the Electrical category definition 46, the Component category definition 48, and the Decorative category definition 50 are all types of "parts" and therefore an instance of any of those category definitions may be used wherever a "part" may be used.

Although it is not necessary to provide any system-defined category definitions, it is currently preferred to provide four basic category definitions which represent: all deliverables in the system; all users of the system; the types of links between category instances; and groups of users. All other category definitions may be deleted by the user. In a preferred embodiment according to the invention, the following pre-defined category definitions are provided: company; file; form; facility; kit; part; and tool, although, in general, any of these pre-defined category definitions can be deleted or modified by a user.

Another definitional item which affects category instances are attributes and link attributes associated with category definitions. Every category definition in the system 10 has at least one associated attribute or link attribute. Each attribute defines a field which instantiations of the category definition possess. An attribute defines a data field possessed by a category instance into which data may be required to be entered. A link attribute allows a user to define a relationship between the category instance and another category instance or between the category instance and a data file. As noted above, category definitions can inherit at least some, and preferably all, of their associated attributes, link attributes, and stages from their "parents"; therefore instantiations of "child" category definitions will have some of the same fields, links, and stages as instantiations of a "parent" category definition because the "child" category definition will have inherited some of its associated attributes, link attributes, and stage definitions from its "parent." Inheritance, however, does not prohibit a user from associating additional attributes, link attributes, or stage definitions to a "child" category definition; thus, instantiations of "child" category definitions may have some fields, links, or stages that instantiations of the "parent" category definition do not have, i.e., "child" categories may have a superset of their "parent's" attributes, link attributes, and stage definitions.

For example, referring to the embodiment shown in FIG. 4, the Cover category definition 52 inherits attributes from the Mechanical category definition 44, which itself inherits attributes from the Part category definition 42. However, the user may add an additional attribute to the Cover category definition 52, e.g. color, which is not possessed by the Mechanical category definition 44 or the Part category definition 42.

It is currently preferred to support the following attribute types: Access, which grants a particular user access to the category object instance; Boolean; Date; Directory Path; File Name; Float, which is a floating point number; Integer; Link; Long Text, which is an unformatted text string; Notification, which identifies users to be notified when a specific event occurs; Role, which identifies users or groups of users; Signature, which identifies, and authenticates the identity of, the user who filled in the field; and Text. It is also currently preferred to allow the user to enter attribute definitions for every attribute type except Access, Directory Path, File Name and Notification, which are filled in by the system 10.

Attributes may be associated with category definitions by allowing pointers to be added to the attributes indicating category definitions that are associated with the attributes. Alternatively, pointers may instead be added to the category definitions indicating attributes with which the category definitions are associated. These pointers may be system-defined, or they may be added by a user having the appropriate authorization. Attributes can themselves be data structures which define the format and properties of the attribute. It is currently preferred to provide attributes as data structures having at least the properties shown below in Table 2.

TABLE 2

Attribute Properties

| Property | Description |
|---|---|
| Name | Text string used to identify and label the attribute. |
| Description | Textual paragraph used to describe the attribute's intended meaning or use. |

TABLE 2-continued

Attribute Properties

| Property | Description |
| --- | --- |
| Type | One of the following system-defined types: access, boolean, date directory path, file name, float, integer, long text, notification, role, signature, text, time. |
| Max char | Maximum number of characters stored as attribute values for text type attributes. |
| Multivalue | Boolean flag that, if true, indicates that there can be more than one attribute value stored for any given item version. |
| Default | Default value assigned to the attribute for an item instance. |
| Inherit | Boolean flag that, if true, specifies that the default values will be inherited from the parent item, if the item is created as an attachment to an existing item. If created independently, the default value is used. |
| Choice menu | Pointer to choice menu. |
| Minimum | Minimum acceptable value for an integer or floating point attribute. |
| Maximum | Maximum acceptable value for an integer or floating point attribute. |
| MinNumber | The minimum number of values, for multivalue attributes. |
| MaxNumber | The maximum number of values, for multivalue attributes. |

Some attributes support the entry of data by means of a choice menu which presents the user with a set of valid entries for the attribute and elicits a selection of one of the choices from the user. Choice menus may be static, i.e. the menu choices may always be the same, or the choice menu may be dynamic, i.e. different choices may be offered to the user at different times. It is currently preferred that static choice menus are data structures having the properties shown below in Table 3.1.

TABLE 3.1

Static Choice Menu Properties

| Property | Description |
| --- | --- |
| Name | Text string used to uniquely identify and label the choice menu. |
| Description | Textual paragraph used to describe the choice menu's intended meaning or use. |
| Choice options | List of pointers that indicate the choices available. |
| Option description | A property of each choice option. Textual paragraph used to describe the meaning of the choice option. |
| Option code | A property of each choice option, used to uniquely |

TABLE 3.1-continued

Static Choice Menu Properties

| Property | Description |
| --- | --- |
| | describe the option (uniqueness is not enforced). |
| Option active | Flag property of each choice option, used to indicate whether or not the option is currently active (available) in the attribute instance (for this attribute in this category). |

Alternatively, the choice menus can be generated in real-time, i.e. dynamically, by a query embedded in the data structure. Dynamic choice menus have the properties shown below in Table 3.2.

TABLE 3.2

Dynamic Choice Menu Properties

| Property | Description |
| --- | --- |
| Name | Text string used to uniquely identify and label the choice menu. |
| Description | Textual paragraph used to describe the choice menu's intended meaning or use. |
| Choice query | Database query which performs an user-defined search of the database and presents matches as choice options. |

As noted above, some field values can be system-defined or assigned by a user. For example, a "file type" attribute could be filled in by the system, because the system will identify a spreadsheet file with a spreadsheet file type. Alternatively, if a category definition has a "color" attribute associated with it, then the field representing the color of an instantiation of that category definition could be filled in by a user of the system.

As noted above, attributes provide for the entry of data while link attributes define relationships between category instances and other category instances or category instances and data files. Link attributes are instances of link definitions, which are another kind of definitional item.

A link definition defines the form that link instances will have in much the same way that category definitions define the form taken by category instances. Link definitions, therefore, also have properties and can have associated attributes. For example, a category definition may have an associated link definition which represents a link, titled "subpart," to a "subpart" category definition. Instantiations of the category definition will have a field, the value of which can be a link to an appropriate "subpart" instance entered by a user. The "subpart" link definition may have an associated attribute called "quantity". Thus, when the user creates a link between instances of the category definition and the "subpart" category definition, the user enters a value representing the number of "subparts" necessary to create an instance of the category definition. It is currently preferred to provide link definitions as a data structure having at least the properties shown in Table 4.

TABLE 4

Link Definition Properties

| Property | Description |
| --- | --- |
| Name | Text string used to identify and label the link definition. |
| Description | Textual paragraph used to describe the link definition's intended meaning or use. |
| Abstract | Boolean flag that, if true, prevents instances from being created of the link definition. |
| Number from | Integer used as the starting number in an automatic sequence generator that adds one for every instance created of the link definition. The current value of the sequence generator can be embedded in default values of attributes assigned to the link definition. |
| Dependent | Boolean flag that, if true, indicates that any changes to the parent require changes to the child. |
| Child category | Category of item versions that are children of links in this link definition (item versions that are parents of links in this category are in the category with an attribute using/based on this link definition). |

All link fields are directional. Instances of the category definition that own the link are the higher level objects that control, are composed from, are defined by, or are described by the other object. For example, in the above "subpart" relationship, the category instance which has "subpart" instances as subparts is the "parent" and the "subpart" instance itself is the "child". A "parent" may be dependent on its "children" for its definition, progress through stages, or existence. For example, work on the above higher-level object is not complete until the necessary number of subparts have been supplied.

Figure 5:
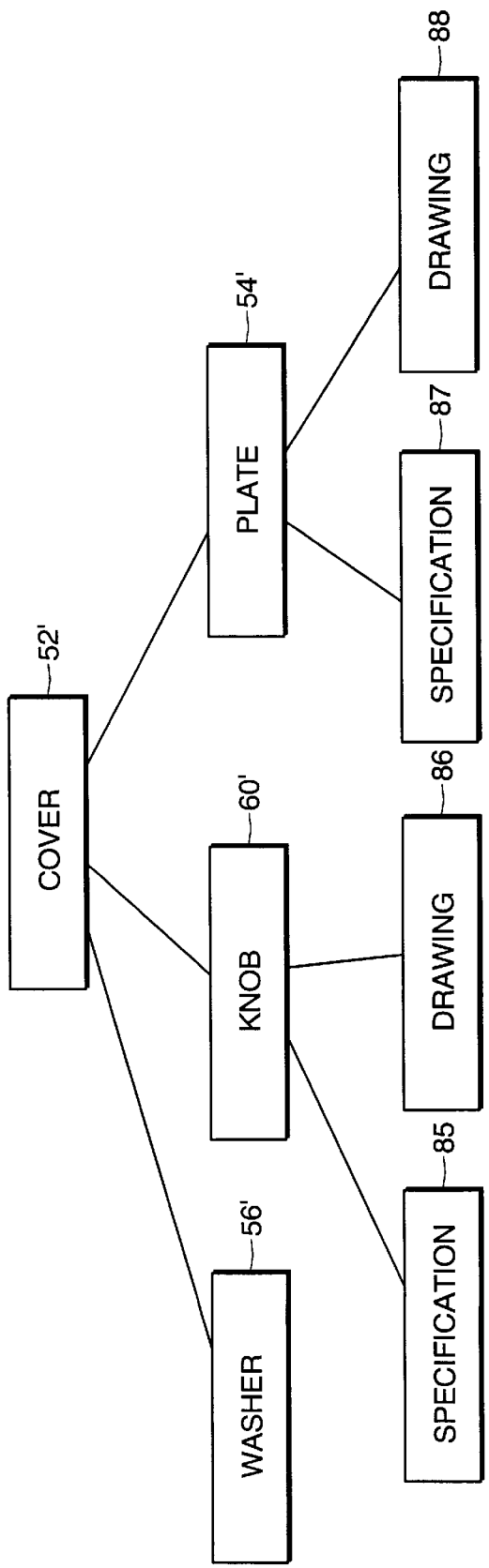
FIG. 5 is a block diagram of a product hierarchy.

FIG. 5 shows an embodiment of a product hierarchy. Product hierarchies are very different from category definition hierarchies such as the one shown in FIG. 4 because product hierarchies are constructed of category instances. FIG. 5 shows an instantiation of a cover 52'. Associated with the cover instantiation 52' are subparts washer 56', knob 60' and plate 54'. Each one of these subparts are instances of a category definition. The relationships between the cover instance 52' and the washer instance 56', the plate instance 54', and the knob instance 60' are themselves instances of a link definition which defines the relationship between a part and its related subparts. FIG. 5 also illustrates that various instantiations may themselves have associated items. For example, knob instance 60' has a specification 85 and a drawing 86. The specification or drawing can be required for the knob instance 60' to exit a stage of its life-cycle. Similarly, plate instance 54' has a specification 87 and a drawing 88 which may or may not be required to exit a stage of the plate instance's 54' life-cycle.

Another definitional item which describes instantiations of category definitions is a stage definition. Each category definition can have at least one stage definition associated with it, although it is currently preferred that only category definitions representing deliverables, e.g. parts, have stage definitions associated with them. A stage definition defines a major sequential step or level of progress in the life-cycle of instances of a particular category definition and controls access to category instances. For example, the Part category definition 42 shown in FIG. 4 may have four stage definitions associated with it: "specify," "design," "manufacture," and "release." Any "part" category instance must progress at least through each one of those four stages before it is completed, and it may have to progress through more than those four stages. This is because, like attributes which were discussed above, a "child" category inherits its "parent's" associated stage definitions, but the inherited set of stage definitions may be supplemented by the user. Each category definition, with its associated stage definitions, represents the overall life-cycle of each category instance created from it.

Stage definitions control user access to category instances with access, roles, and notification properties of each stage definition. Access properties grant responsibility for, and access to, a category instance during a particular stage of that category instance's life-cycle. It currently is preferred that the access attributes are system-defined for all category definitions and can have the following four values: Planner, which represents roles that can create a category instance during that stage; Doer, which represents roles that can actually do work on the category instance during that stage; Administrator, which represents roles that can do work on and delete the category instance during that stage; and Distribution, which represents roles that can view the instance during that stage.

Access assignments to category instances during a particular stage are made by the role attribute. Put another way, the value stored for a particular access field of a category instantiation is a role. Roles, like fields, can have user-provided values for each category instance or the role value can be system-supplied. A role attribute defines a relationship between a category instance and a specific set of users or groups.

Roles are assigned by users or groups of users. Each role can specify a user, or group of users, authorized to access a category instance during a particular stage. For example, access to a category instance during a particular stage can be limited to those users who are assigned the role of designer for the instance during that stage. The role of designer may be assigned to a collection of users, a collection of groups of users, or both.

Notification properties define which users receive notice when a particular event in a stage of a category instance's life-cycle occurs. Notifications are system-defined properties of stage definitions and are assigned by role. Users could be notified by e-mail, voice mail, facsimile message or a message directly to their computer screen, although it is currently preferred to notify users by e-mail. Notifications are properties of stages based on changing stage or status, and include: Notify on Request; Notify on Start; Notify on End; Notify on On/Off Hold; Notify if Late; and Notify on Cancel.

In the preferred embodiment, stage definitions are data structures that control access to instances of the category definition with which they are associated during that stage. It is currently preferred that each stage definition is a data structure that has the properties shown in Table 5.

TABLE 5

Stage Definition Properties

| Property | Description |
| --- | --- |
| Name | Text string up to used to uniquely identify the stage definition. |
| Description | Textual paragraph used to describe the stage definition's intended meaning or use. |
| Work To Do | Table specifying whether each attribute and link is editable, required, and visible (display property) during this stage. |
| Planner | Identifies the role whose value represents roles that can create a category instance during the defined stage. |
| Doer | Identifies the role whose value represents roles that can actually do work on a category instance during the defined stage. |
| Administrator | Identifies the role whose value represents roles that can do work on and delete a category instance during the defined stage. |
| Distribution | Identifies the role whose value represents roles that can view the instance during the defined stage. |
| Instructions | Textual paragraph that provides the planner, doer, and reviewer with instructions on how to perform the work involved in the stage definition. |
| Notify on request | Role to whom an e-mail message is sent when the stage starts. |
| Notify on start | Role to whom an e-mail message is sent when work on the item begins. |
| Notify on end | Role to whom an e-mail message is sent when the item is finished. |
| Notify on/off hold | Role to whom an e-mail message is sent when the item is put on hold or taken off hold. |
| Notify if late | Role to whom an e-mail message is sent when the item is behind schedule. |
| Notify on cancel | Role to whom an e-mail message is sent when the item is canceled. |
| Estimated start time | Estimated elapse time between the moment the stage can begin and the moment it actually starts. |
| Estimated end time | Estimated elapse time between the moment the stage starts and the moment it actually ends. |

The "Work to Do" property of the stage definition is a table which specifies which category instance fields are editable, visible, or required, during the stage of the category instance's life-cycle defined by the stage definition. In this way, the stage definition allows control over the process of producing a work deliverable to be defined by the work deliverable itself. For example, referring to FIG. 4, a Part category definition 42 can have an associated stage definition called "design". This stage definition is inherited by the Mechanical category definition 44 because that category definition is a child of the Part category definition 42. Similarly, the Cover category definition 52, since it is a child of the Mechanical category definition 44 also inherits the "design" stage definition.

Since the Cover category definition 52 has an associated "design" stage definition, an instantiation of the Cover category definition 52 will be invoked to represent the "design" stage of a cover's life-cycle. Whether or not a user who has doer access to the cover during this stage must provide a color for the cover is controlled by the "Work to Do" property of the stage definition. That property may require a doer to give a color to the cover during its design stage, in which case the design stage cannot be exited until the doer assigns a color to the cover. Similarly, the "Work to Do" property of the stage definition may specify that the color field of a cover instance is not visible by a doer during the design stage. In this case, the doer will not even see the color field and therefore will not be distracted by a field for which no information need be entered at this stage.

As noted above, in order for an item represented by a category instance to progress from one stage to a subsequent stage in its life-cycle, entry of substantive information or substantive work product by the appropriate user or users may be required. The substantive work product may take a variety of forms. Since fields of a category instance may provide directly for the entry of information, completion of a stage may require the entry of item metadata directly into that field. Alternatively, a field may provide a link to a file which must be created before the stage is complete or a link to another category instance which must itself be finished before the stage is complete.

In accordance with the invention, the substantive information is generally not the entry of only an authorized signature which itself contains no substantive information needed to complete the stage. However, the substantive information required to complete a stage may be defined by the user as simply a signature which may be verified, for example, by requiring the entry of a password by the user.

When a category instance enters a new stage in its life-cycle, the field values from the previous stage are automatically saved and archived in the database. In this way, sequential category instances are stored and a history of changes or progress on an item across time is stored. Only the currently active category instance stores on-going changes to fields and linked files. Category instances from previous stages are historic and frozen in time.

All files, including previous versions, are stored in a central location on the system 10, called a vault 30. A vault 30 may be defined by the system on hard drive storage, tape storage, or other memory devices, and the vault 30 may exist on a specialized storage unit or it may be distributed over the entire system. It is currently preferred that vaults 30 are user-defined memory locations and are used to store data files of file versions managed by the system 10. Users can define an unlimited number of vaults 30 in which data files can be stored.

A work effort, project, or arbitrary process changes in scope and complexity as new deliverables, each with their own life-cycle stages, are attached to, or removed from, the overall project or process structure. A user tailors a specific project or project component by adding attachments, replacing attachments with others, and removing attachments, for each type of attachment that is currently modifiable. Users involved in the project can tailor only those project components to which they have appropriate access, based on the scope of their authority, and the policies defined for those components. Because the process definition is inherent in the deliverables, the entire set of stages from all attachments always presents an accurate picture of work to be done, as well as past work. The overall process cannot fail to match the deliverables.

Varying degrees of process flexibility are built in by defining, for each deliverable, the types of attachments it can have. For each attachment type, the types of attachments can be defined broadly or narrowly. Then, for each stage in the item's life-cycle, each type of attachment can be made one of the following: invisible to the user, visible but not modifiable, modifiable, or required. A highly inflexible process would require users to make specific attachments at specific points in the item's life-cycle, or would prevent users from modifying existing attachments. For example, a definition of a project deliverable may require that a specification be attached at one stage, and may prevent that specification from being modified in subsequent stages. A highly flexible process would allow users to modify the set of attachments at any stage. For example, a project definition may include an optional specification at one stage, and that optional specification may continue to be modifiable during subsequent stages.

Figure 6:
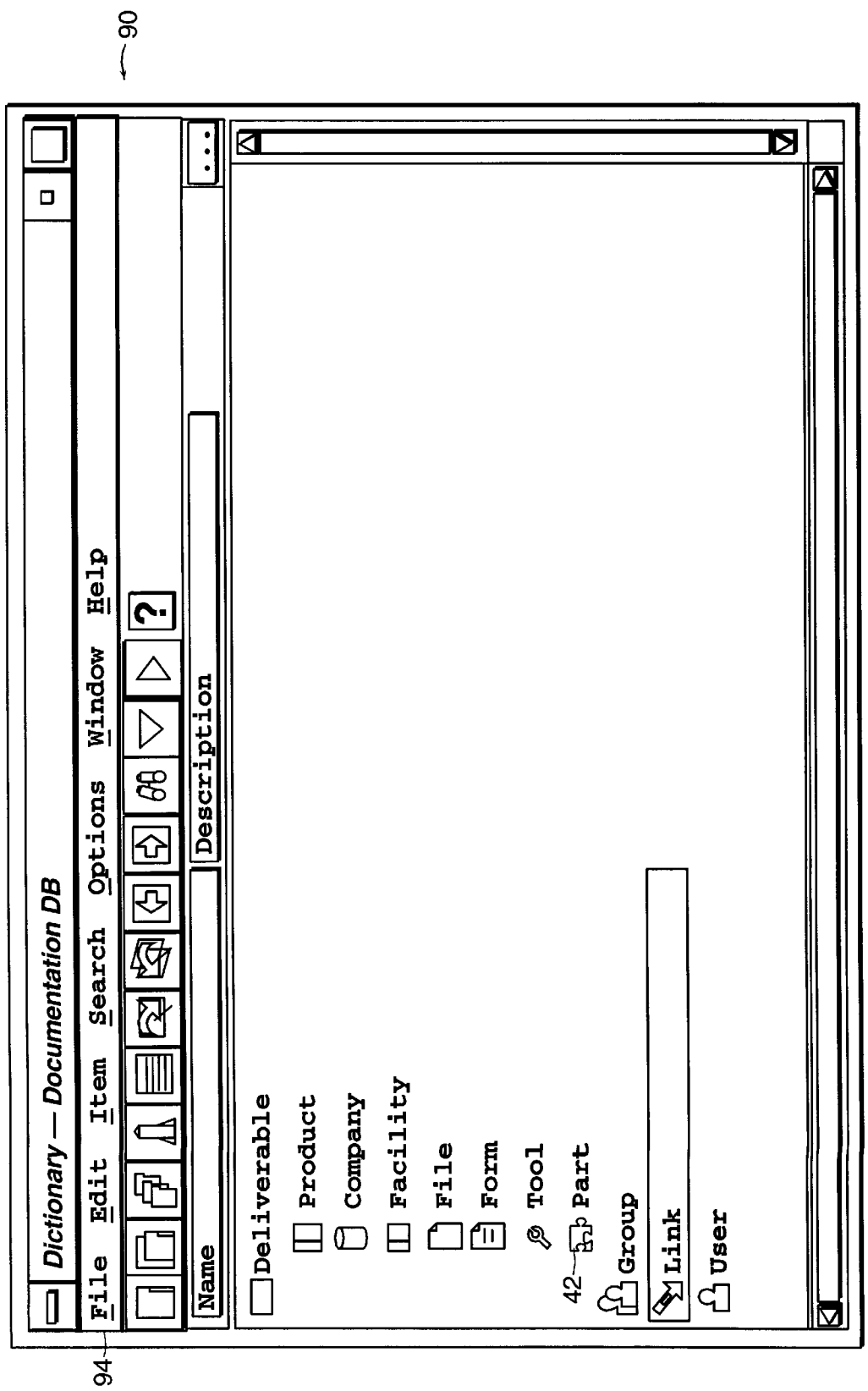
FIG. 6 is a diagrammatic view of an embodiment of the graphical user interface of the present invention showing a Dictionary desktop.

Referring now to FIG. 4, a user desiring to manage the manufacture of stereo components using the system 10, may define the category definition hierarchy 40 as shown. The user must create a number of new category definitions which are children of the system defined Part category definition 42. The system 10 provides the user with a graphical user interface, an embodiment which is shown in FIG. 6. FIG. 6 depicts a Dictionary desktop 90, which is one of many desktops available to users of the system 10. For example, a user may also have an Inbasket desktop. Only users which have the appropriate authorization to create or modify category definitions may use the Dictionary desktop 90.

Using the Dictionary desktop 90, the user can create, for example, a Mechanical subcategory 44 of the Part category definition 42 by selecting the Part category definition 42. Part category definition 42 may be selected in any number of ways. For example, Part category definition 42 may be selected by "pointing and clicking" on it with a mouse. Alternatively, a keyboard may be used to select Part category definition 42. Once Part category definition 42 is selected, the user selects the Attach New . . . command from the File menu 94.

Figure 8:
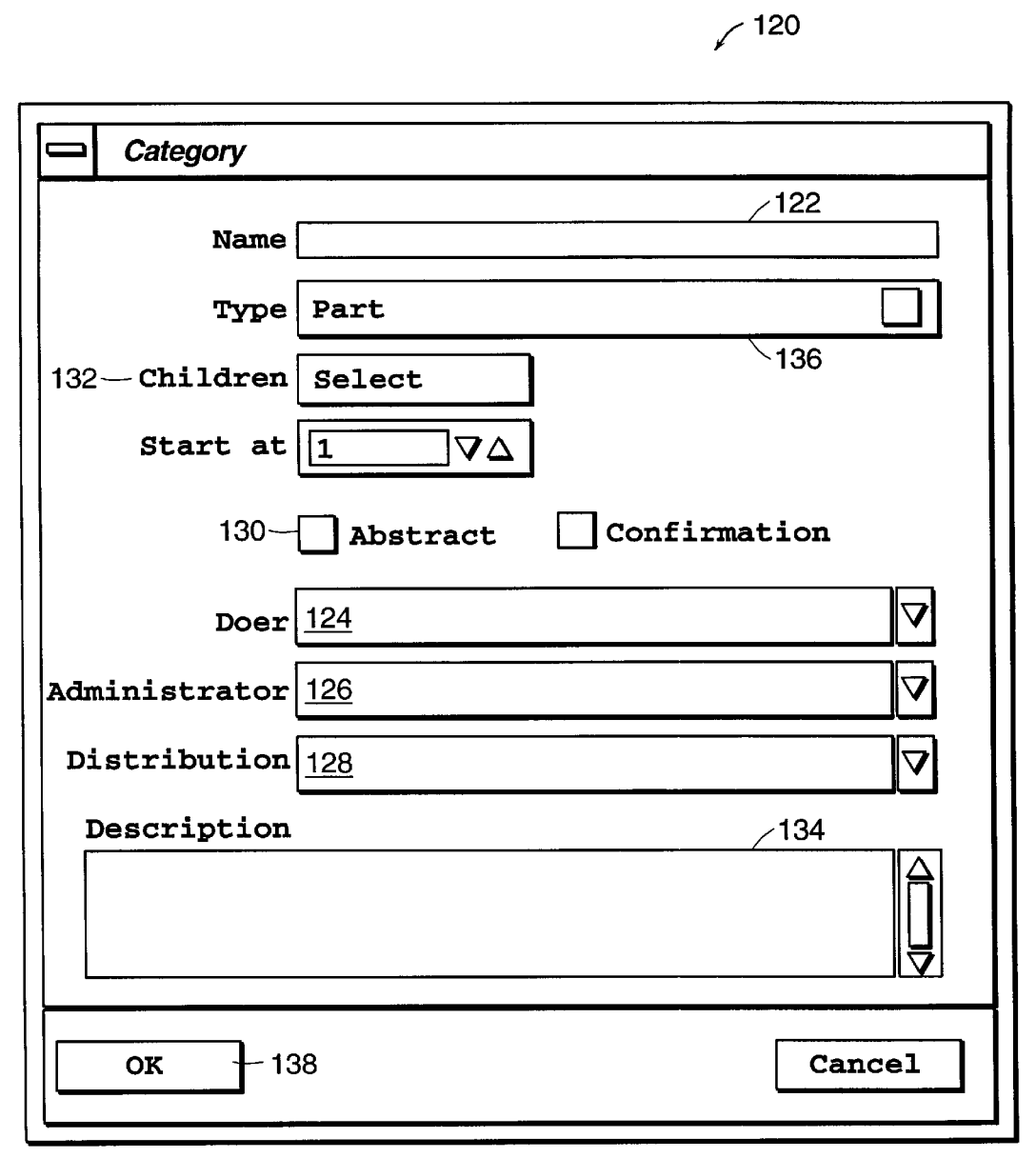

Selection of the Attach New . . . command causes the display to display the Attach New . . . Dialog Box 100, shown in FIG. 7. The Attach New . . . Dialog Box 100 allows the user to select a new item to attach to the selected Part category definition 42, including attributes, link attributes, and stage definitions. Since the user is creating a subcategory of the Part category definition 42, the user selects "Category." This selection causes the Category Window 120 to be displayed, shown in FIG. 8. FIG. 8 shows the information that the user may fill in to create the new category definition: Name 122, Doer identity 124, Administrator identity 126, Distribution identity 128, the Abstract flag 130, Children of the new category 132, and a Description of the new category's intended use 134. Type information 136 for the new category is already filled in, because the new category was created as an attachment to the Part category definition 42, i.e. the new category is a subcategory of the Part category definition 42.

Figure 9:
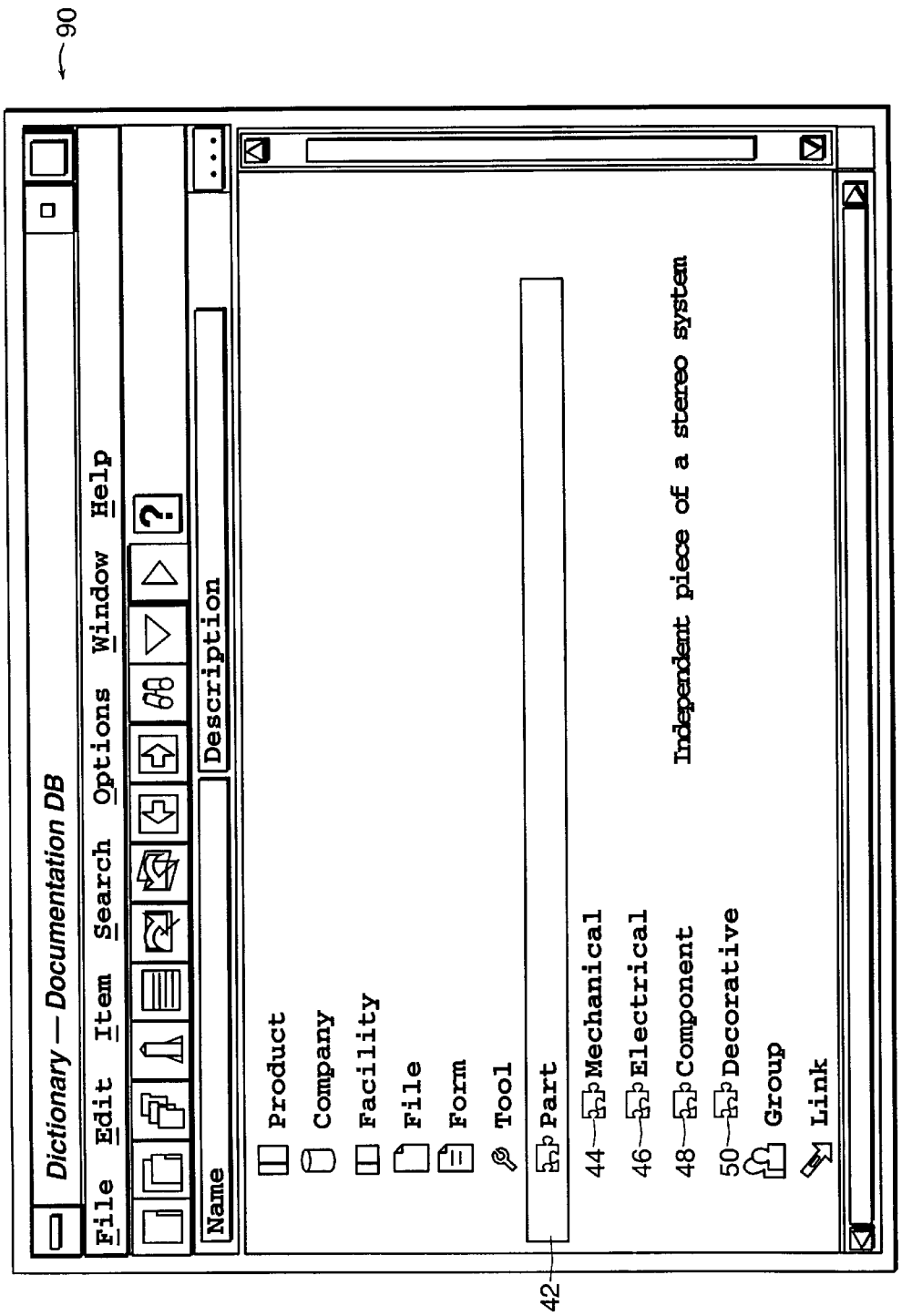
FIG. 9 is a diagrammatic view of an embodiment of the graphical user interface of the present invention showing the Dictionary desktop of FIG. 7 with subcategories displayed.

Once the user is satisfied with the information entered in the Category Window 120, the OK button 138 is selected, which indicates that the new category should be added to the database 22 and listed as a subcategory beneath the Part category definition 42 in the Dictionary desktop 90. FIG. 9 shows the Dictionary desktop 90 with four new subcategories of the Part category definition 42 displayed. The Mechanical 44, Electrical 46, Component 48, and Decorative 50 subcategories are indicated by their indentation beneath the Part category definition 42.

Figure 10:
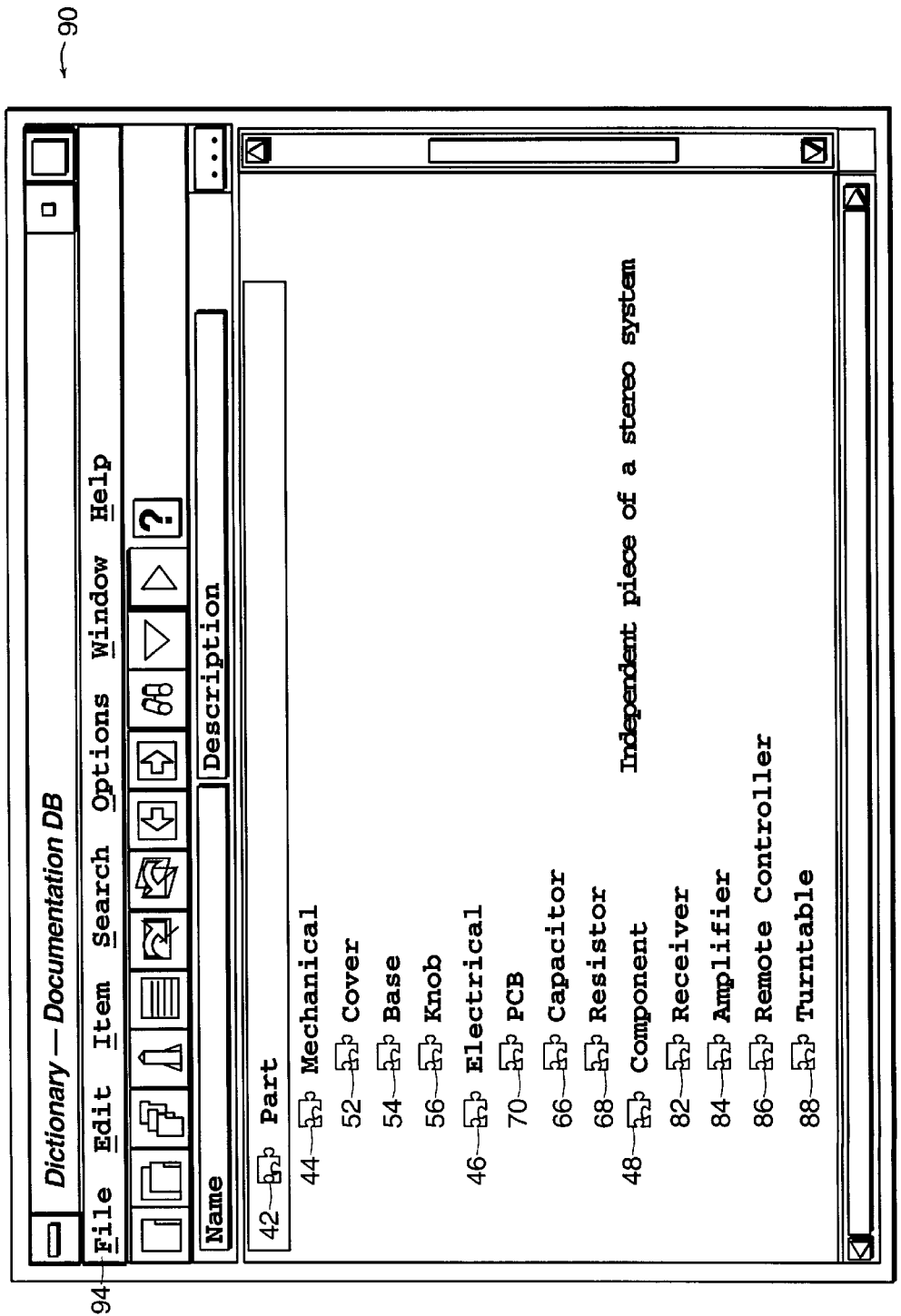
FIG. 10 is a diagrammatic view of an embodiment of the graphical user interface of the present invention showing the Dictionary desktop with subcategories displayed.

The user may follow the same set of steps to add a subcategory to the Mechanical category 44. FIG. 10 shows the Dictionary desktop 90 displaying several new subcategories which have been added by the user. The Mechanical 44 category definition is shown having subcategory definitions named Cover 52, Base 54 and Knob 60. The Electrical category definition 46 is shown having a PCB subcategory definition 70, a Capacitor subcategory definition 66, and a Resistor subcategory definition 68. Similarly, the Component category definition 48 is shown having four subcategory definitions: Receiver 82, Amplifier 84, Remote Control 86, and Turntable 88.

Figure 7:
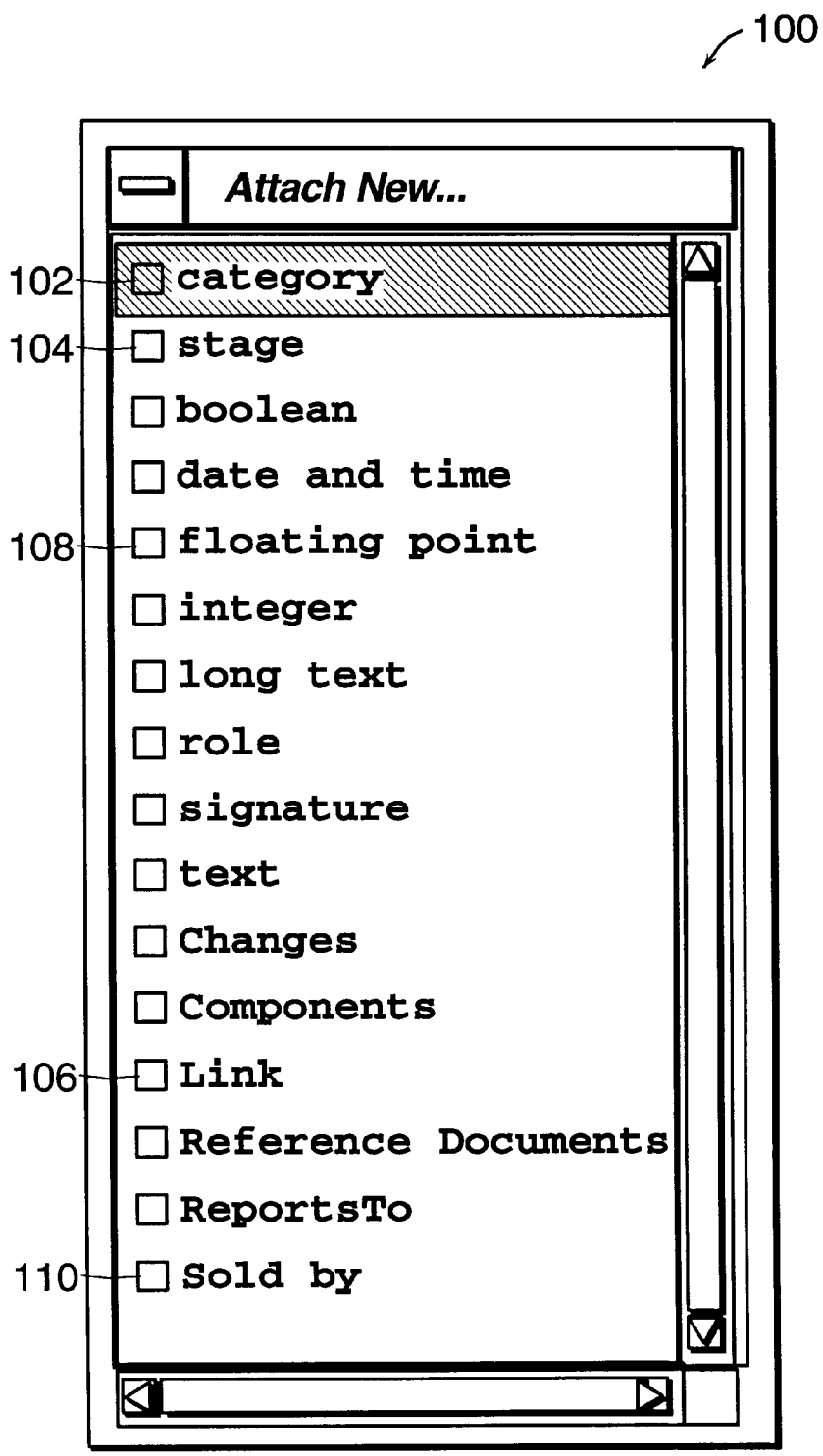
FIG. 7 is a diagrammatic view of an embodiment of the graphical user interface of the present invention showing an Attach New . . . Dialog Box.

Using the Dictionary desktop 90, the user may select any displayed category definition in order to attach a new element to it. Once the desired category definition is selected, the Attach New . . . command is selected from the File menu 94 to display the Attach New . . . Dialog Box 100 (FIG. 7). The Attach New . . . Dialog Box 100 allows the user to attach new items to a category definition, including new categories 102, new stage definitions 104, and new link attributes 106.

Alternatively, if the user desires to associate an already existing item with a category definition, the category definition is selected from the Dictionary desktop 90, and the Attach Item command from the File menu 94 is selected.

For example, referring to FIG. 10, the user attaches a new Height attribute to the Part category definition 42 by selecting the Part category definition 42 and selecting the Attach New . . . command from the File menu 94. The Attach New . . . Dialog Box 100 shown in FIG. 7 is displayed, and the user selects Floating Point 108 in order to create a new floating point attribute for part instantiations.

Figure 11:
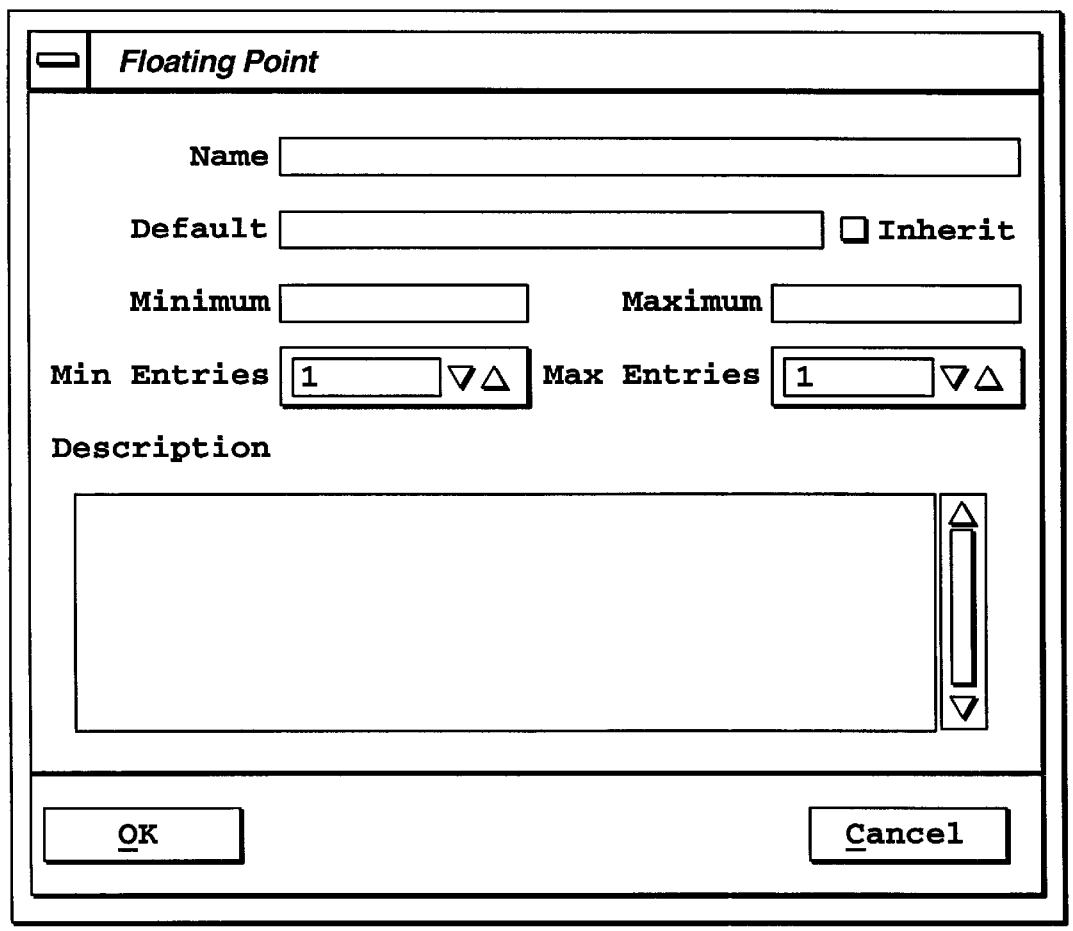
FIG. 11 is a diagrammatic view of an embodiment of the graphical user interface of the present invention showing a Floating Point Attribute Window.

Selection of Floating Point 108 causes the Floating Point Attribute Window 140 to be displayed, shown in FIG. 11. The user then supplies the desired information and clicks OK to attach the new Height floating point attribute to the Part category definition 42. Since the Mechanical 44, Electrical 46, Component 48, and Decorative 50 category definitions are all subcategories of the Part category definitions 42, instantiations of each of those category definitions will have an associated Height attribute which is a floating point number.

Figure 12:
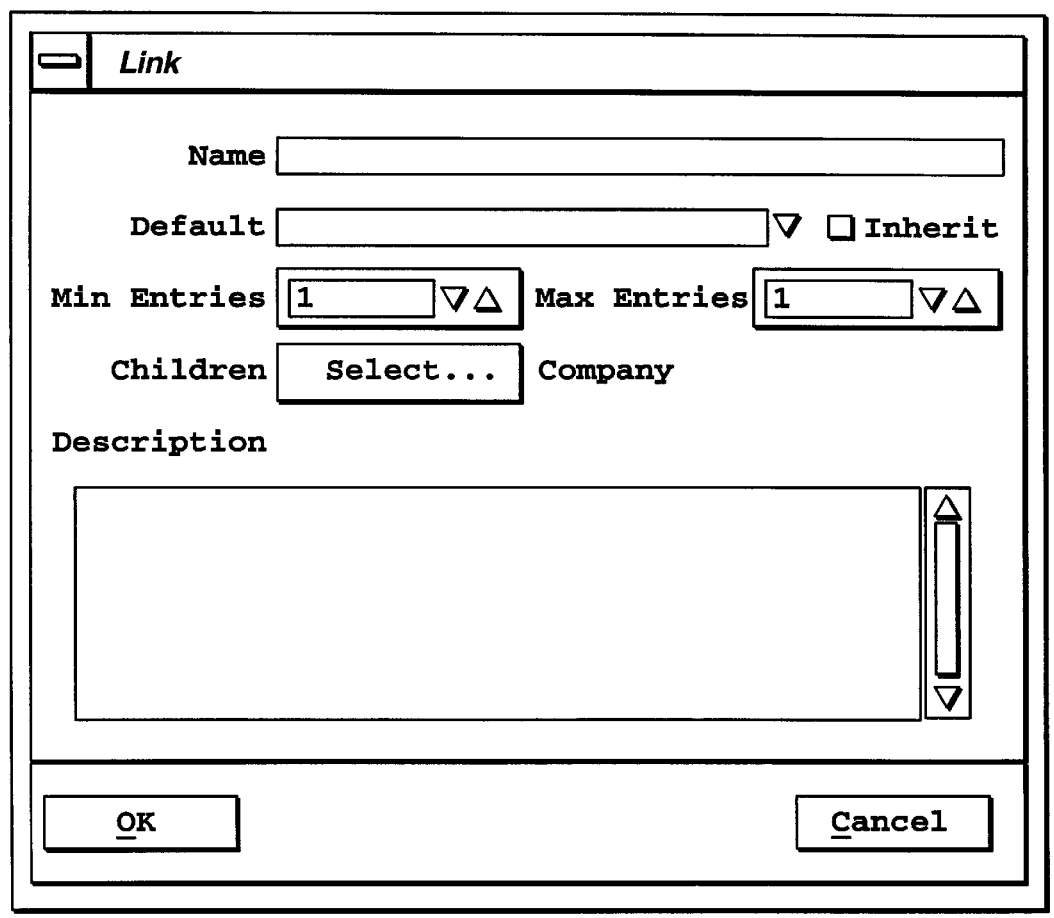
FIG. 12 is a diagrammatic view of an embodiment of the graphical user interface of the present invention showing a Link Attribute Window.

Similarly, the user may add a new Link attribute to a category definition selected from the Dictionary desktop 90 by selecting a link type from the Attach New . . . Dialog Box 100. For example, a user may desire to attach a "Manufactured By" link attribute with the Part category definition 42. From the Attach New . . . Dialog Box 100, the user selects "Sold By" 110, which is a user-defined link definition. This causes the Link Attribute Window 160 to be displayed, shown in FIG. 12. Once the user has filled in desired information and clicked on the OK button, the new link attribute is associated with the selected category definition.

Figure 13:
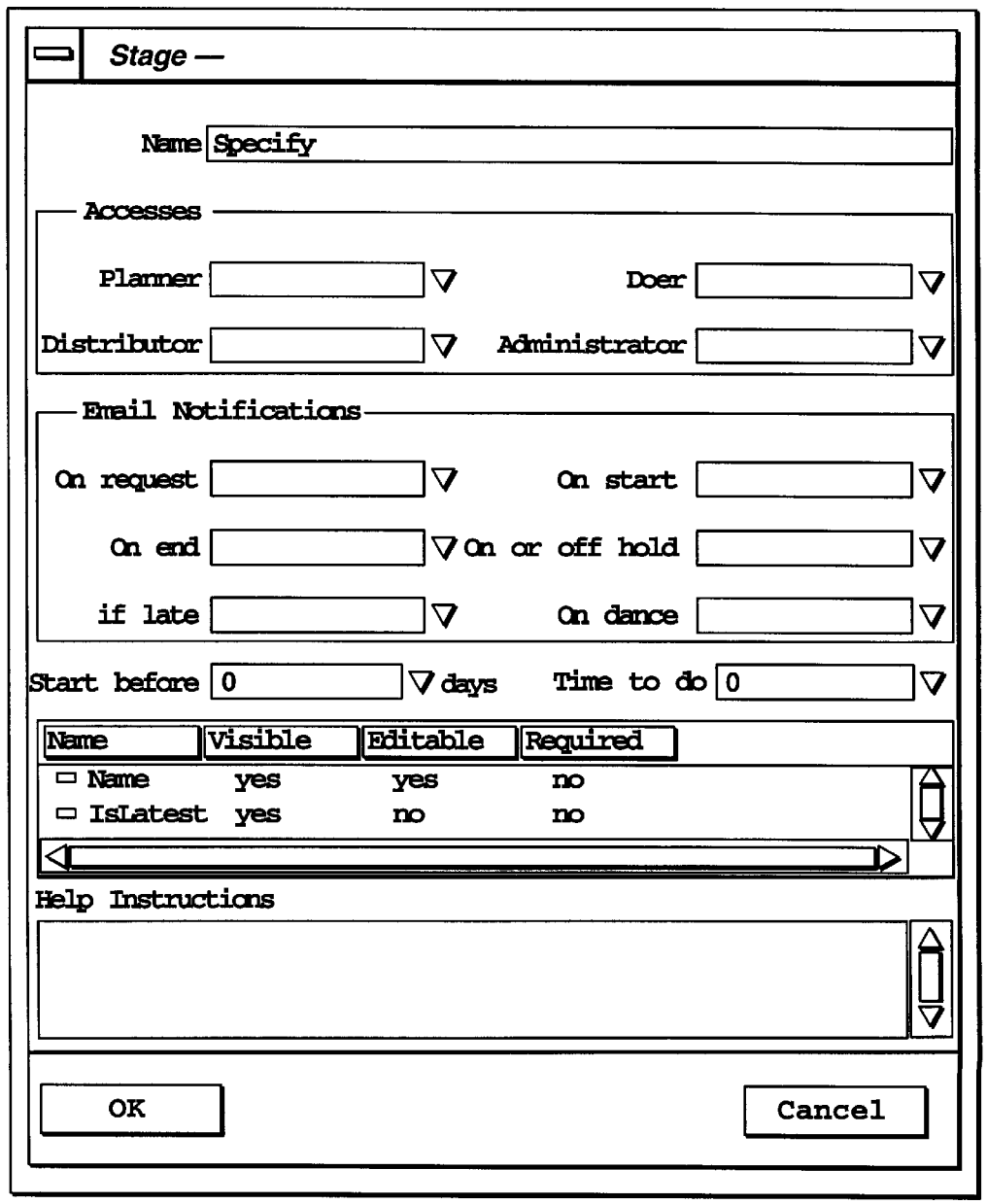
FIG. 13 is a diagrammatic view of an embodiment of the graphical user interface of the present invention showing a Stage Window.

The user may also define stage definitions which are associated with each of the category definitions present in the system 10. For example, the user can select the Part category definition 42 from the Dictionary desktop 90 and select the Attach New . . . command from the File menu 94. After Stage 104 is selected from the Attach New . . . Dialog Box 100, the user is presented with the Stage Definition Window 180 shown in FIG. 13. This screen allows the user to fill in the appropriate information regarding the particular stage definition which the user is creating. For example, the user may create the following stage definitions for the Part category definition 42: "specify"; "design"; "manufacture" and "release". Similarly, the user may follow the same steps to create stage definitions for a predefined "file" category definition consisting of: "create and revise"; "review"; and "approved".

Figure 14:
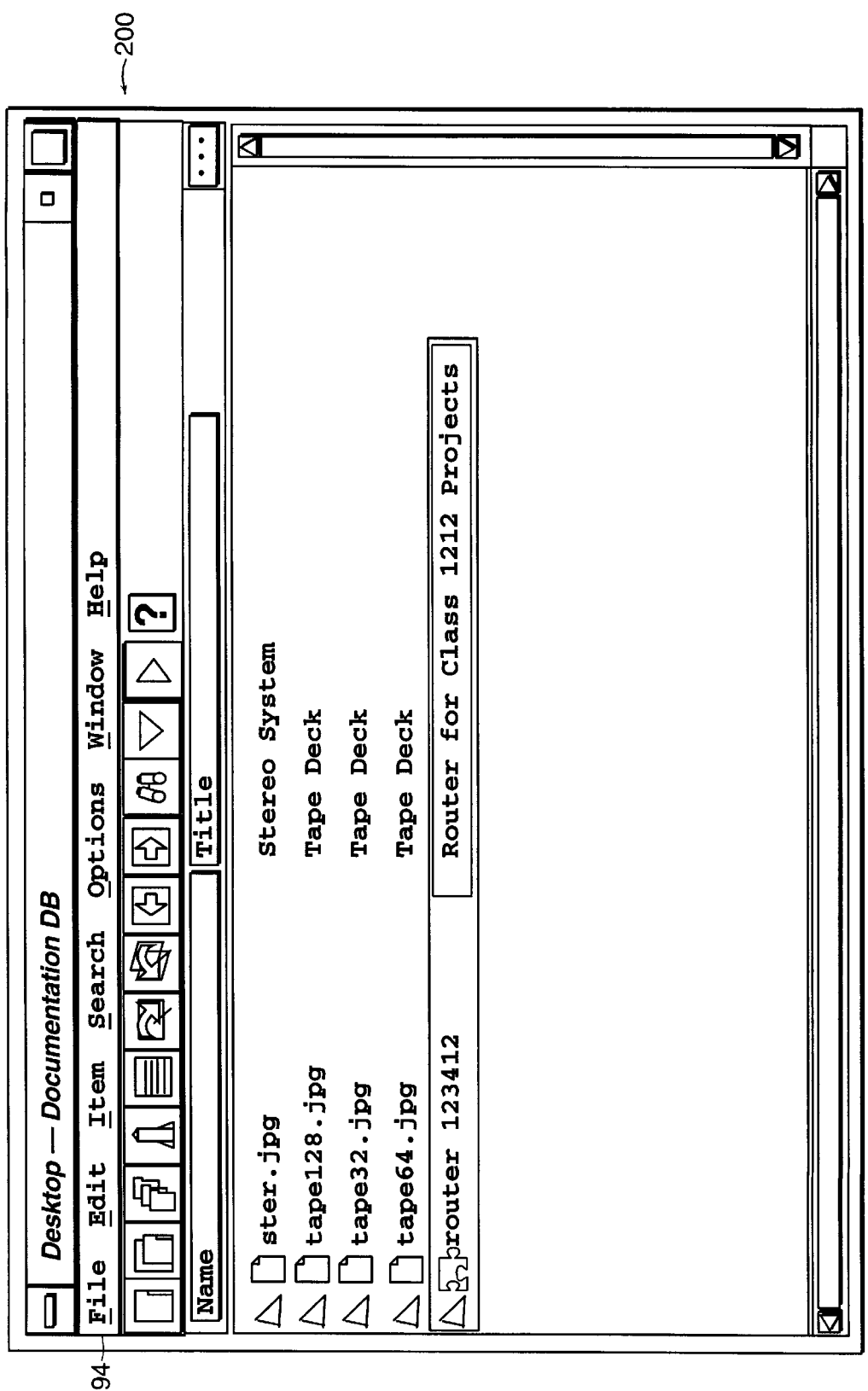
FIG. 14 is a diagrammatic view of an embodiment of the graphical user interface of the present invention showing a user's desktop.
Figure 15:
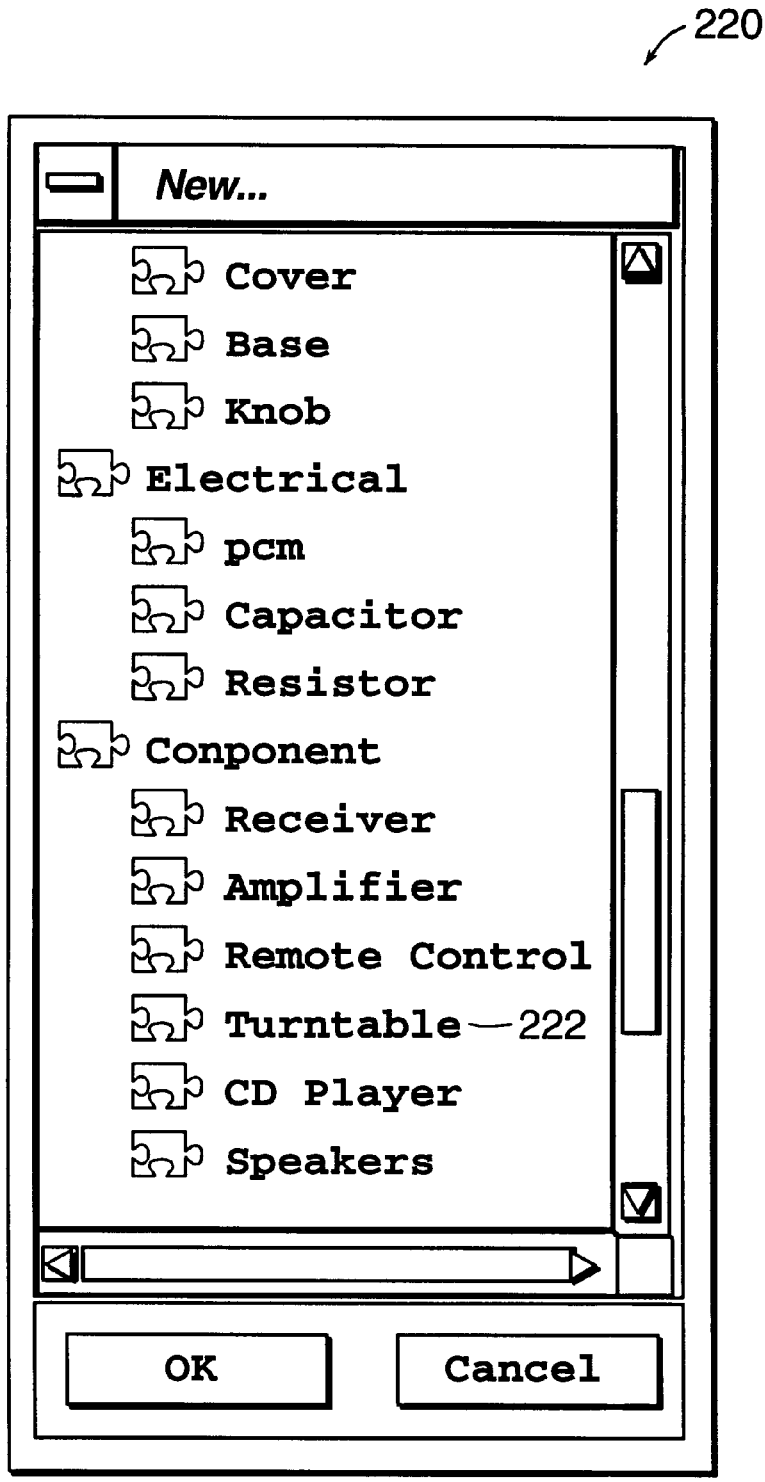
FIG. 15 is an embodiment of the graphical user interface of the present invention showing a New . . . Dialog Box.
Figure 16:
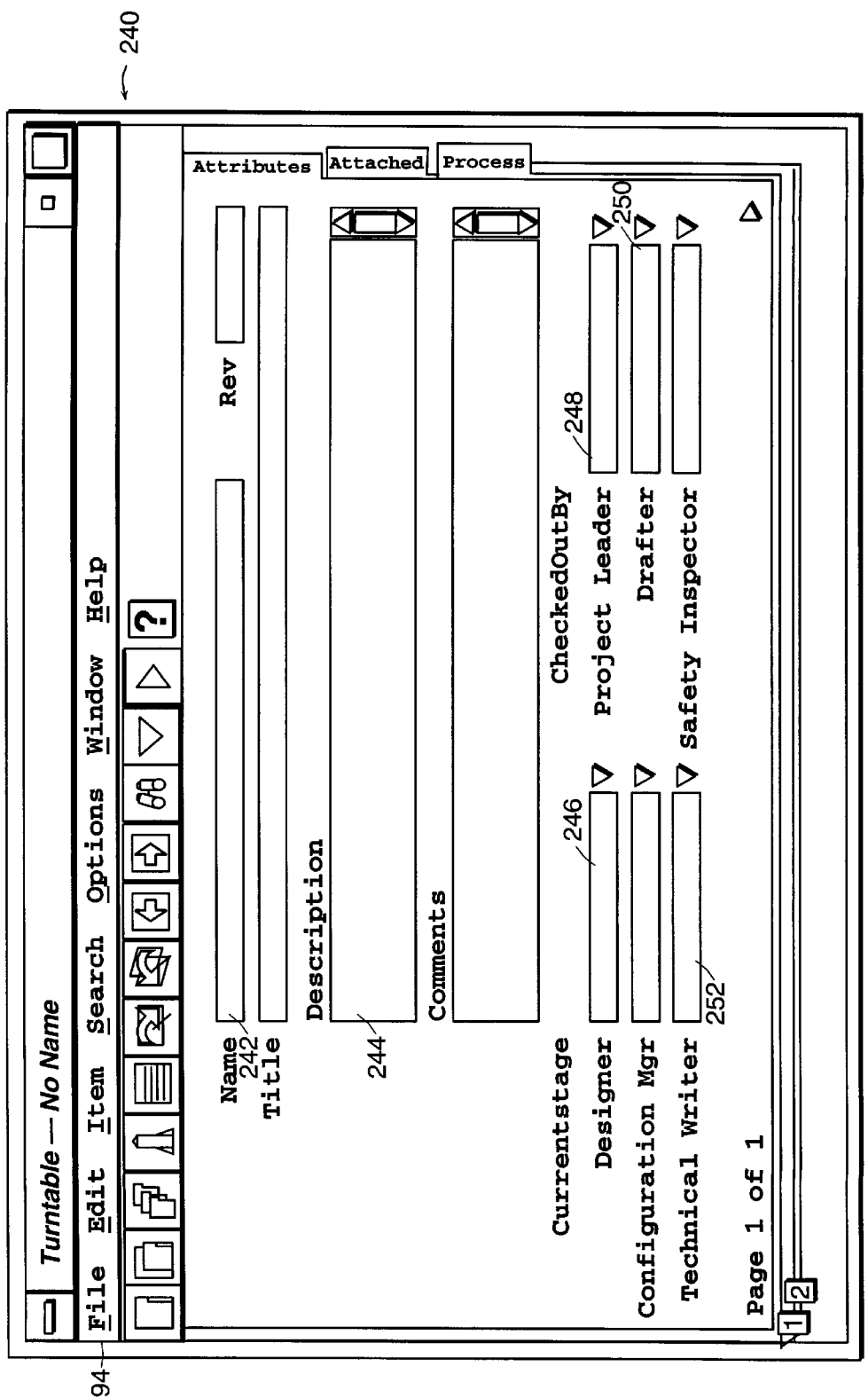
FIG. 16 is an embodiment of the graphical user interface of the present invention showing a New Turntable Window.

New projects are begun from one of a user's desktops. FIG. 14 depicts an exemplary desktop 200 of a user of the system 10. The user of the system 10 may now desire to begin a new turntable project. The user creates a new turntable by using the New . . . command in the File menu 94. Selection of the New . . . command causes the New . . . Dialog Box 220 to be displayed (shown in FIG. 15). The user may select any one of items displayed in the New . . . Dialog Box 220. When the user selects "turntable" 222 from the New . . . Dialog Box 220, a New Turntable Window 240 is displayed, shown in FIG. 16. The New Turntable Window 240 allows the user to enter information about the new turntable instantiation, such as the Name 242 of the new turntable, a description of the new turntable 244, the users who fulfill the roles of designers 246, project leaders 248, drafters 250, and technical writers 252, among others.

Figure 17:
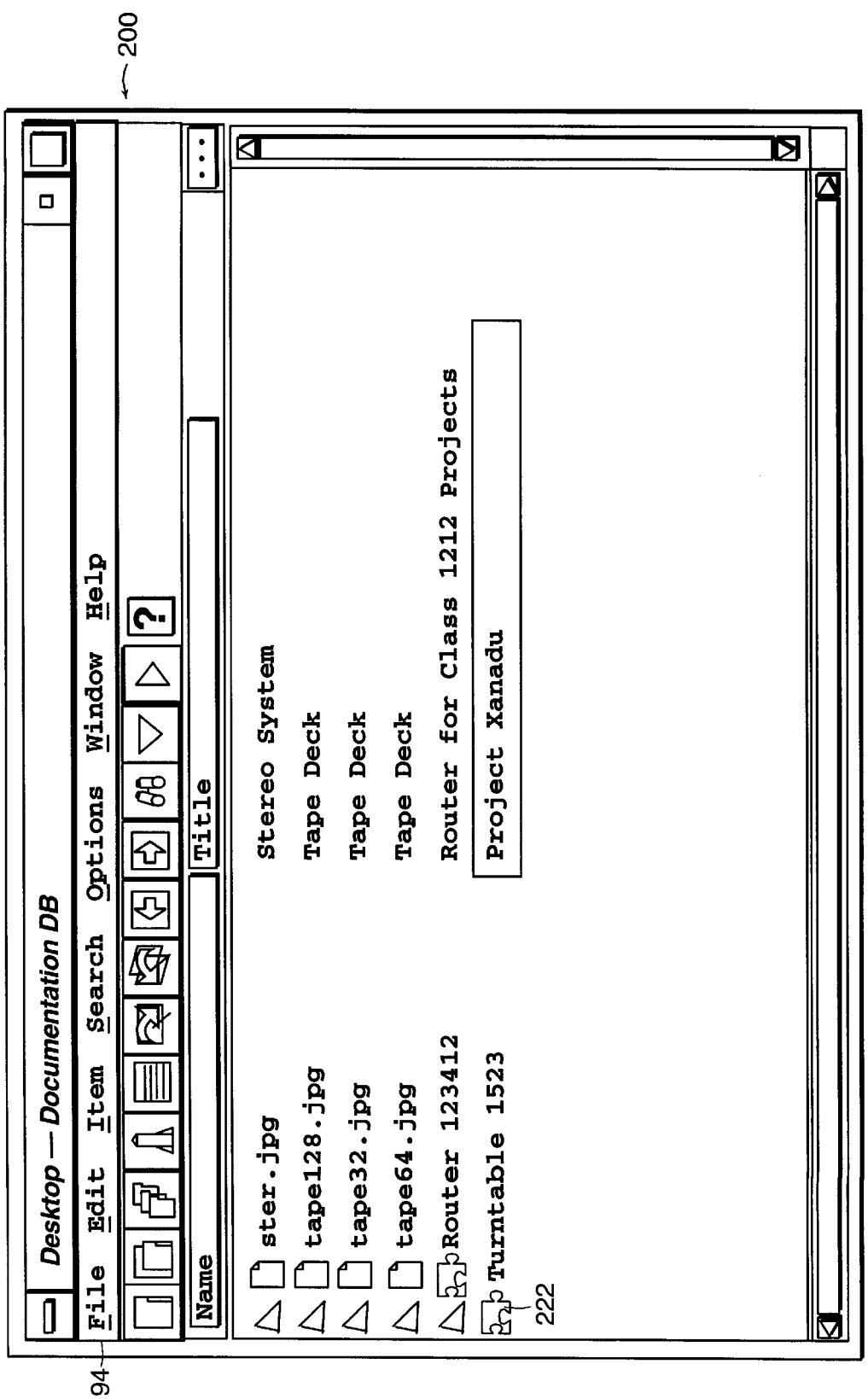
FIG. 17 is an embodiment of the graphical user interface of the present invention showing a user's desktop.

The user saves the new turntable instance by using the Save command in the File menu 94. The new turntable instance, like any other database instance, can be displayed on the user's desktop 200, shown in FIG. 17. Since the turntable category definition 86 is a "child" of the Product category definition 50, and since the Product category definition 50 is a "child" of the Part category definition 42, the turntable instantiation has all of the stages defined by the stage definitions associated with the Part category definition 42. Therefore, the turntable category instantiation begins at a "specification" stage. At this point, the work deliverables required by the "specification" stage, which are defined by the "Work to Do" property of the specify stage definition of the Part category definition 42 must be entered by the appropriate user.

Figure 18:
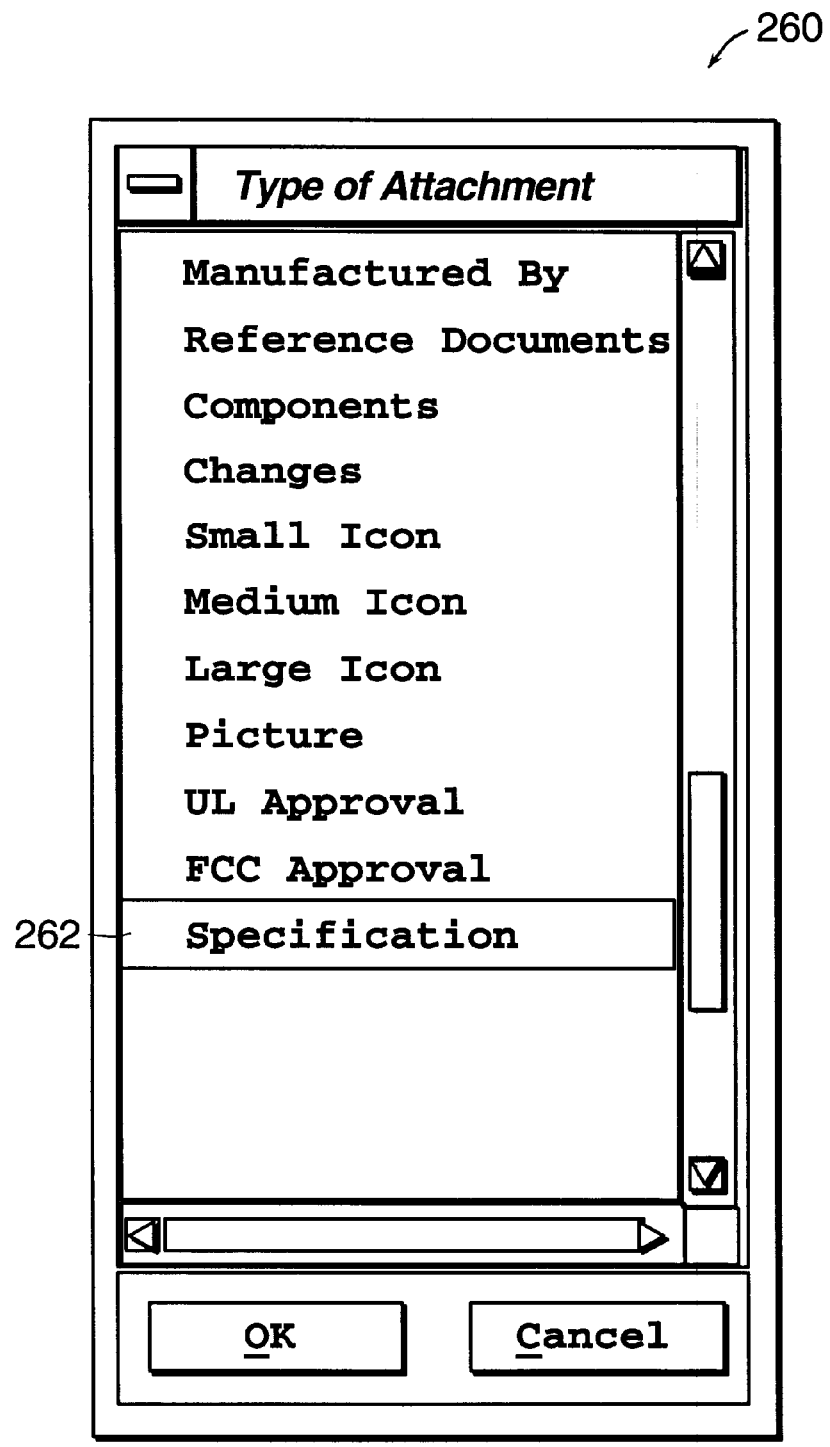
FIG. 18 is an embodiment of the graphical user interface of the present invention showing an Attach New . . . Dialog Box.
Figure 19:
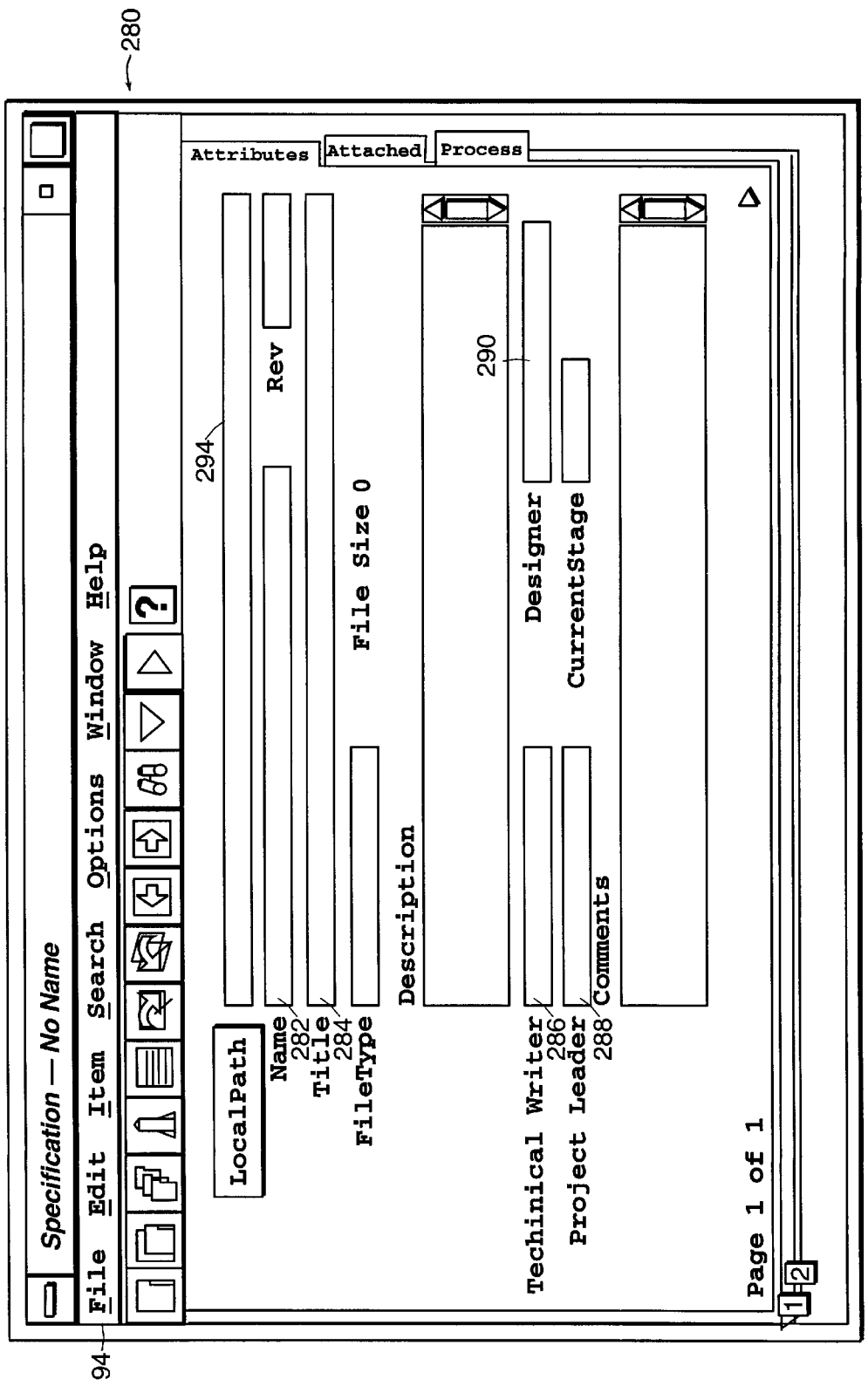
FIG. 19 is an embodiment of the graphical user interface of the present interface showing a Specification File Window.

For example, one of the required work deliverables may be a specification file. To attach a new specification to this turntable, the user selects the turntable instance 222 from the desktop 200 and selects the Attach New . . . command from the File menu 94. The Attach New . . . Dialog Box 260, shown in FIG. 18, lists possible turntable attachments. When the user selects Specification 262 from the Attach New . . . Dialog Box 260, a Specification File Window 280, shown in FIG. 19, is displayed. The user fills in the name of the specification 282 and other properties such as Title 284 and the identities of the technical writer 286, the project leader 288, and the designer 290. The user may use a file browser to locate the specification file in the user's file system. Once found, the specification path name (i.e. logical location in the system 10) is entered by the system 10 in the local path field 294.

Since the new file instantiation is an instantiation of a "file" category definition, then that file instantiation has all of the stages associated with the "file" category definition. Thus, the specification file begins in the "create and revise" stage. Whatever elements are required by the "create and revise" stage of the file instantiation must be entered by the appropriate user before the specification file instantiation will be allowed to exit the "create and revise" stage and proceed to the "review" stage. The specification file must successfully exit the "create and revise" stage, the "review" stage, and the "approved" stage, before it is considered complete.

When the user is finished working on the Specification, he or she selects the Send Forward command from the File menu 94 to send the specification forward to next stage in its life-cycle. To successfully send an item forward all required fields and attachments must be complete. For example, to send the turntable instantiation 222 forward into its next stage, the specification must be complete, i.e. must have itself been sent forward from "in progress" to "in approval" to "released". Once all of the required work deliverables have been entered into the system, and the system has verified that those work deliverables exist, the turntable category instantiation 222 may exit the "specify" stage and proceed to the "design" stage, which itself may have a number of required deliverables which in turn have a number of stages that they must go through.

Thus, proper use of stage definitions and category definition hierarchies allows end users of the present invention to tailor work efforts easily and efficiently. Also, the present invention provides for a greater amount of information security, since fields, which may include files may be rendered invisible to users not having the appropriate access in any given stage.

The system of the present invention may also be provided as computer-readable software code or other such "program means" embodied on an "article of manufacture". The program means may be carried or embodied on any one or more of a variety of "articles of manufacture" which are capable of transferring the "program means" to a specialized or general-purpose computer such that the computer "runs" or executes the "program means." The "article or articles of manufacture" can be, for example, a floppy disk, a removable magnetic disk, a hard drive, an optical disk, a CD-ROM, ROM, or flash memory.

The functions which the computer-readable "program means" cause to occur or make available include: creating and manipulating category definitions; notifying a user when work is to be started; allowing a user to access and change a work deliverable; and allowing a user to indicate that work has been completed. The "program means" embodied on the "article of manufacture" may be written in any appropriate computer language, such as PASCAL, C, C++, PERL, ADA, assembly language, or machine code. In one embodiment, the "article of manufacture" has further embodied on it computer-readable program means for linking a set of category definitions with other category definitions.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A system for managing development of a project by a plurality of users, the project including at least one discrete work deliverable, said system comprising:

a memory device;

at least one category instance stored on said memory device, the category instance defined by a category definition and representing the discrete work deliverable, said category instance having a life-cycle comprising at least one stage defined by a stage definition, said stage being completed upon the entry by at least one user of substantive information required to create said discrete work deliverable;

means for notifying an appropriate user when substantive work is necessary to complete said stage of said category instance;

means for controlling the access of the appropriate user to each category instance, said controlling means responsive to said stage;

means for controlling the responsibility of the appropriate user for each category instance, said controlling means responsive to said stage; and means for allowing said appropriate user to indicate that said substantive work is completed, thereby completing said stage of the life-cycle of said category instance.

2. The system of claim 1 further comprising:
means for creating a plurality of category definitions each having a plurality of attributes and a plurality of associated stage definitions;
means for creating a plurality of category instances each representing at least one of said plurality of category definitions during a particular stage defined by at least one of said plurality of associated stage definitions, said category instances having a plurality of fields for the entry of substantive work necessary to complete said stage; and
means for storing said plurality of category definitions and said plurality of category instances.

3. The system of claim 1 further comprising:
means for relating one of said plurality of category instances to another of said plurality of category instances.

4. The system of claim 1 wherein
said notifing means comprises a display device; and
said allowing means comprises an input device for manipulating a graphical user interface.

5. A computer implemented method for managing development of a project by a plurality of users, the project including at least one discrete work deliverable, said method comprising the steps of:
defining at least one category instance using a category definition, the category instance representing the discrete work deliverable and having a life-cycle comprising at least one stage defined by a stage definition, said stage being completed upon the entry by at least one user of substantive information required to complete said discrete work deliverable;
storing said category instance and said stage definition on a memory device;
controlling, in response to said stage, the responsibility of the appropriate user for each category instance;
notifying an appropriate user when substantive work is necessary to complete said stage of said category instance;
permitting, in response to said stage, the appropriate user to access each category instance; and
allowing the appropriate user to indicate that the substantive work is completed, thereby completing the stage of the life-cycle of said category instance.

6. The method of claim 5 further comprising the steps of
(i) associating the category definition with at least one attribute; and
(ii) providing in the category instance at least one field providing for the entry by the system user of substantive information defined by the attribute associated with the category definition.

7. The method of claim 6 further comprising the step of relating the category instance to other category instances in the system using the attribute.

8. The method of claim 6 further comprising the step of using the field to identify a file for receiving substantive information.

9. The method of claim 5 further comprising the step of associating a display and an input device with the method user, wherein the display and the input device allow the method user to create, modify, and delete the category definition and said category instance.

10. The method of claim 9 further comprising the steps of displaying a graphical user interface on the display device and manipulating the graphical user interface with the input device.

11. The method of claim 6 further comprising the step of controlling, using the stage definition, whether the field of said category instance is viewable, editable, or required during the stage.

12. The method of claim 6 further comprising the step of representing each of a plurality of method users by one of a plurality of first category instances.

13. The method of claim 12 further comprising the step of including in each category instance representing a user a field that associates each category instance representing a user with a second category instance representing a group of users.

14. The method of claim 6 further comprising the step of providing in the category definition a parent identifier that identifies a second category definition, wherein the category definition inherits the at least one stage definition and the at least one attribute from the second category definition.

15. The method of claim 14 further comprising the step of using instances of the category definition whenever instances of the second category definition may be used.

16. The method of claim 5 wherein the step of storing said category instance and said stage definition on a memory device further comprises storing on a memory device selected from the group of: random access memory, hard disc, floppy disc, optical disc, and flash memory card.

17. The method of claim 5 further comprising the step of storing a version of the category instance is stored in the memory device for each of the stages.

18. The method of claim 5 wherein the step of allowing the appropriate user to indicate that the substantive work is completed filter comprises validating that substantive work for all required fields and related category instances of said category instance has been entered.

19. An article of manufacture having computer-readable program means for managing development of a project embodied thereon, the project including at least one discrete work deliverable, comprising:
computer readable program means for defining at least one category instance using a category definition, the category instance representing the discrete work deliverable and having a life-cycle comprising at least one stage defined by a stage definition, said stage being completed upon the entry by at least one user of substantive information required to complete said discrete work deliverable;
computer readable program means for storing said category instance and said stage definition on a memory device;
computer readable program means for controlling, in response to said stage, the responsibility of the appropriate user for each category instance;
computer readable program means for notifying an appropriate user when substantive work is necessary to complete said stage of said category instance;
computer readable program means for permitting, in response to said stage, the appropriate user to access each category instance; and
computer readable program means for allowing the appropriate user to indicate that the substantive work is completed, thereby completing the stage of the life-cycle of said category instance.

20. The article of manufacture of claim 19, further comprising:

computer readable program means for associating the category definition with at least one attribute; and computer readable program means for providing in the category instance at least one field providing for the entry by the system user of substantive information defined by the attribute associated with the category definition.

21. The article of manufacture of claim 20, further comprising:

computer readable program means for controlling, using the stage definition, whether the field of said category instance is viewable, editable, or required during the stage.

* * * * *